(12) United States Patent
Katsuki et al.

(10) Patent No.: US 11,240,475 B2
(45) Date of Patent: Feb. 1, 2022

(54) INFORMATION PROCESSING APPARATUS AND METHOD

(71) Applicant: SONY CORPORATION, Tokyo (JP)

(72) Inventors: Yugo Katsuki, Tokyo (JP); Kiyoto Someya, Tokyo (JP); Naoki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/046,364

(22) PCT Filed: Apr. 4, 2019

(86) PCT No.: PCT/JP2019/014921
§ 371 (c)(1),
(2) Date: Oct. 9, 2020

(87) PCT Pub. No.: WO2019/203002
PCT Pub. Date: Oct. 24, 2019

(65) Prior Publication Data
US 2021/0152795 A1 May 20, 2021

(30) Foreign Application Priority Data
Apr. 17, 2018 (JP) .............................. JP2018-079129

(51) Int. Cl.
*H04N 9/31* (2006.01)
*G03B 21/14* (2006.01)
*G03B 21/20* (2006.01)

(52) U.S. Cl.
CPC ......... *H04N 9/3185* (2013.01); *G03B 21/147* (2013.01); *G03B 21/2046* (2013.01); *H04N 9/3155* (2013.01)

(58) Field of Classification Search
CPC .... G03B 21/008; G03B 21/28; G03B 21/142; G03B 21/147; G03B 21/208;
(Continued)

(56) References Cited

U.S. PATENT DOCUMENTS 9,075,296 B2 * 7/2015 Watanabe .............. G03B 21/53
2004/0218813 A1 * 11/2004 Okada ................ H04N 5/23248
382/167
(Continued)

FOREIGN PATENT DOCUMENTS

CN 1577048 A 2/2005
CN 102236784 A 11/2011
(Continued)

OTHER PUBLICATIONS

International Search Report and Written Opinion of PCT Application No. PCT/JP2019/014921, dated Jun. 25, 2019, 10 pages of ISRWO.

*Primary Examiner* — Sultan Chowdhury
(74) *Attorney, Agent, or Firm* — Chip Law Group

(57) ABSTRACT

The present disclosure relates to an information processing apparatus and method that allow an image projection position to be controlled with more ease. Correction information of an image is generated such that the image is projected onto a desired region of a real space. For example, the correction information is generated such that the projected image is located at a desired position as seen from a given viewpoint position. Also, for example, a correction vector is generated that corrects each pixel position of the image as the correction information. The present disclosure is applicable, for example, to an information processing apparatus, a projection apparatus, an imaging apparatus, a projection imaging apparatus, a projection imaging control apparatus, an image projection imaging system, or the like.

15 Claims, 17 Drawing Sheets

(58) Field of Classification Search
CPC ............ G03B 21/2013; G03B 21/2033; G03B 21/2046; G03B 21/2053; H04N 9/3105; H04N 9/3155; H04N 9/3161; H04N 9/3164; H04N 9/3185; H04N 9/3188; H04N 9/3197; G06T 5/001; G06T 5/002; G06T 5/003; G06T 5/50
See application file for complete search history.

(56) References Cited

U.S. PATENT DOCUMENTS

| | | | |
|---|---|---|---|
| 2005/0018144 A1 | 1/2005 | Wada et al. | |
| 2010/0103385 A1* | 4/2010 | Kubota | G03B 21/147 353/70 |
| 2011/0274353 A1 | 11/2011 | Yu et al. | |
| 2015/0187057 A1* | 7/2015 | Kobayashi | H04N 9/3194 345/647 |
| 2015/0348267 A1 | 12/2015 | Hayashi | |
| 2018/0182115 A1* | 6/2018 | Nakagawa | G03B 21/142 |
| 2019/0146313 A1* | 5/2019 | Cruz | H04N 9/3194 345/581 |

FOREIGN PATENT DOCUMENTS

| | | |
|---|---|---|
| CN | 105323519 A | 2/2016 |
| EP | 1492355 A2 | 12/2004 |
| EP | 1954061 A2 | 8/2008 |
| JP | 2005-039769 A | 2/2005 |
| JP | 2005-234698 A | 9/2005 |
| JP | 2011-238228 A | 11/2011 |
| JP | 2013-153392 A | 8/2013 |
| JP | 2013-187764 A | 9/2013 |
| JP | 2013-192098 A | 9/2013 |
| JP | 2015-228056 A | 12/2015 |
| TW | 200508941 A | 3/2005 |
| WO | 2017/104447 A1 | 6/2017 |

* cited by examiner

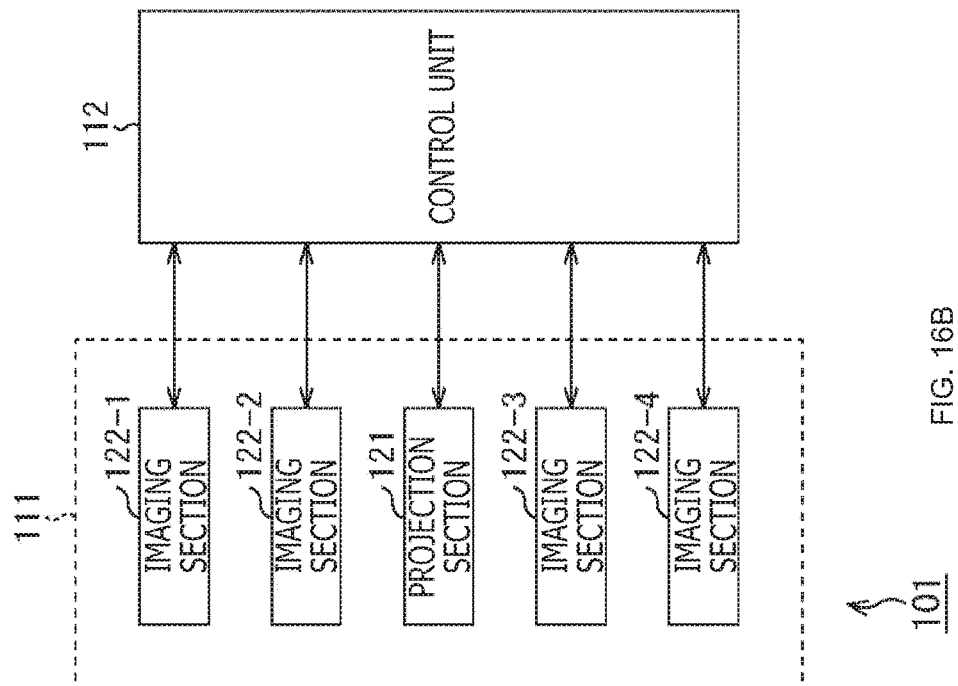
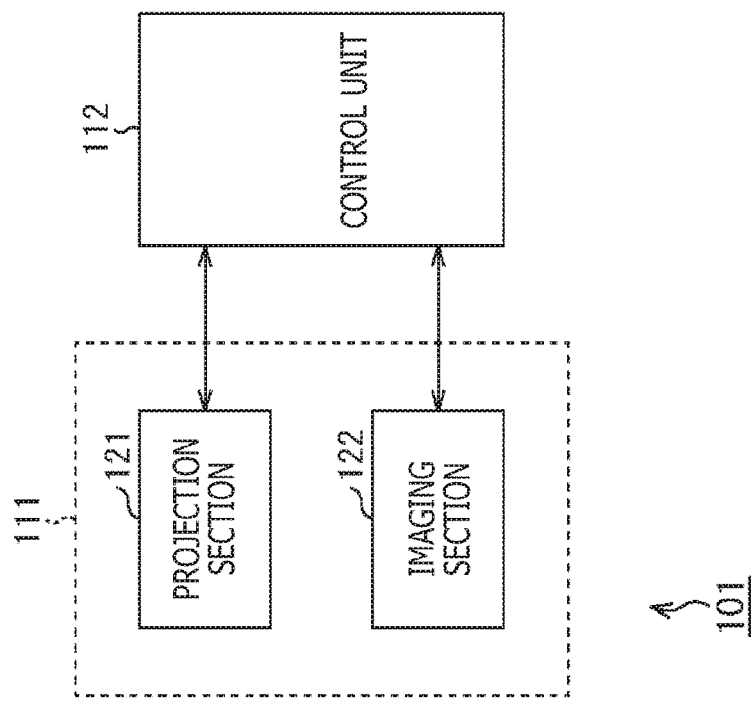
FIG. 16B
FIG. 16A

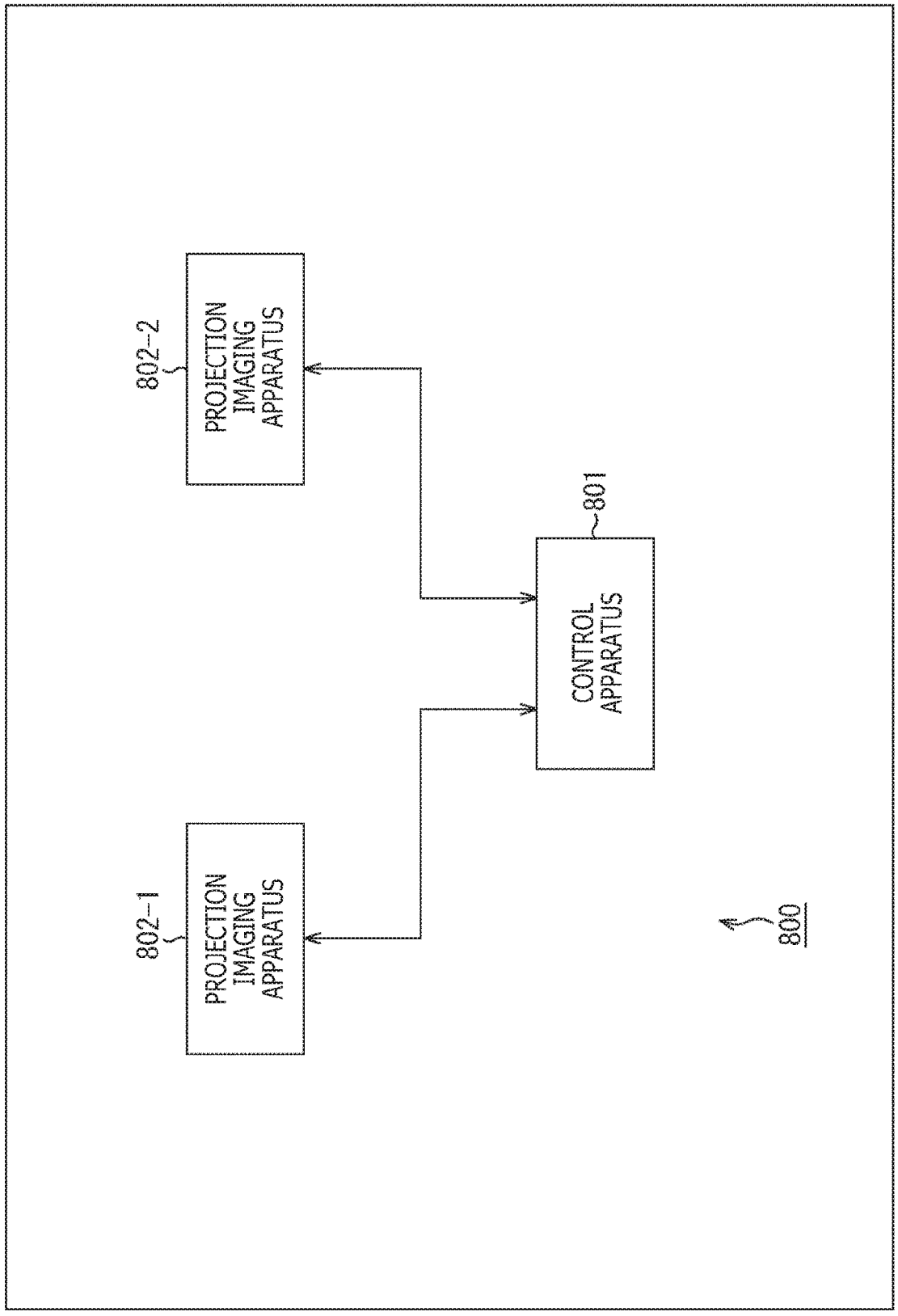

INFORMATION PROCESSING APPARATUS AND METHOD

CROSS REFERENCE TO RELATED APPLICATIONS

This application is a U.S. National Phase of International Patent Application No. PCT/JP2019/014921 filed on Apr. 4, 2019, which claims priority benefit of Japanese Patent Application No. JP 2018-079129 filed in the Japan Patent Office on Apr. 17, 2018. Each of the above-referenced applications is hereby incorporated herein by reference in its entirety.

TECHNICAL FIELD

The present disclosure relates to an information processing apparatus and method and particularly to an information processing apparatus and method that allow an image projection position to be controlled with more ease.

BACKGROUND ART

To date, there have been conceived a wide variety of techniques for controlling projection of an image onto a desired position in image projection using a projector. In particular, what is called an ultra-short focus projector projects an image from a location closer to a projection plane than a conventional long focus projector, more likely resulting in larger distortion of the projected image than the long focus projector and involving a high level of difficulty in image projection onto a desired position (within desired bounds).

As such an image correction technique, there has been one conceived for correcting an image so as to be projected onto a desired position by emitting a special pattern, causing a user to capture an image of the pattern with a camera in hand, and estimating distortion of a projected image on the basis of the captured image (refer, for example, to PTL 1).

CITATION LIST

Patent Literature

[PTL 1]
Japanese Patent Laid-open No. 2013-192098

SUMMARY

Technical Problem

However, such a technique requires troublesome tasks including capture of an image with a camera in hand by a user or the like.

The present disclosure has been devised in light of the foregoing circumstances, and it is an object of the present disclosure to control an image projection position with more ease.

Solution to Problem

An information processing apparatus of an aspect of the present technology includes a correction information generation section adapted to generate correction information of an image such that the image is projected onto a desired region of a real space.

An information processing method of an aspect of the present technology includes generating correction information of an image such that the image is projected onto a desired region of a real space.

In the information processing apparatus and method of the aspect of the present technology, correction information of an image is generated such that the image is projected onto a desired region of a real space.

Advantageous Effect of Invention

According to the present disclosure, it is possible to process information. In particular, it is possible to control an image projection position with more ease.

BRIEF DESCRIPTION OF DRAWINGS

FIGS. 16A and 16B illustrate block diagrams of examples of main components of the projection imaging apparatus.

FIG. 17 is a block diagram illustrating an example of main components of a projection imaging system.

DESCRIPTION OF EMBODIMENTS

Modes for carrying out the present disclosure (hereinafter referred to as embodiments) will be described below. It should be noted that the description will be given in the following order.

1. Image projection position control
2. First embodiment (projection imaging system)
3. Second embodiment (another configuration example)
4. Note

1. Image Projection Position Control

<Image Projection>

To date, there have been conceived a wide variety of techniques for controlling projection of an image onto a desired position in image projection using a projector. In particular, what is called an ultra-short focus projector, which has recently been used widely, projects an image from a location closer to a projection plane than a conventional long focus projector, more likely resulting in larger distortion of the projected image than the long focus projector and involving a high level of difficulty in image projection onto a desired position (within desired bounds).

As such an image correction technique, there has been one conceived for correcting an image so as to be projected onto a desired position by emitting a special pattern, causing a user to capture an image of the pattern with a camera in hand, and estimating distortion of a projected image on the basis of the captured image (refer, for example, to PTL 1).

In the case of such a technique, however, troublesome tasks including capture of an image with a camera in hand by a user or the like are required. Also, the technique described in PTL 1 only corrects distortion of a projected image. In order to project an image onto a desired position (place a projected image at a desired position), troublesome tasks including manually adjusting a projector's projection direction and the like are also required. As a result, an easy-to-use technique for controlling the image projection position has been demanded.

<Image Projection Position Control>

For this reason, image correction information is generated to ensure that the image is projected within a desired region of a real space.

For example, a correction information generation section for generating correction information of an image is provided in an information processing apparatus to project the image within a desired region of the real space.

This makes it possible to control the image projection position with more ease by simply correcting an image to be projected with the correction information.

2. First Embodiment

<Projection Imaging System>

Figure 1:
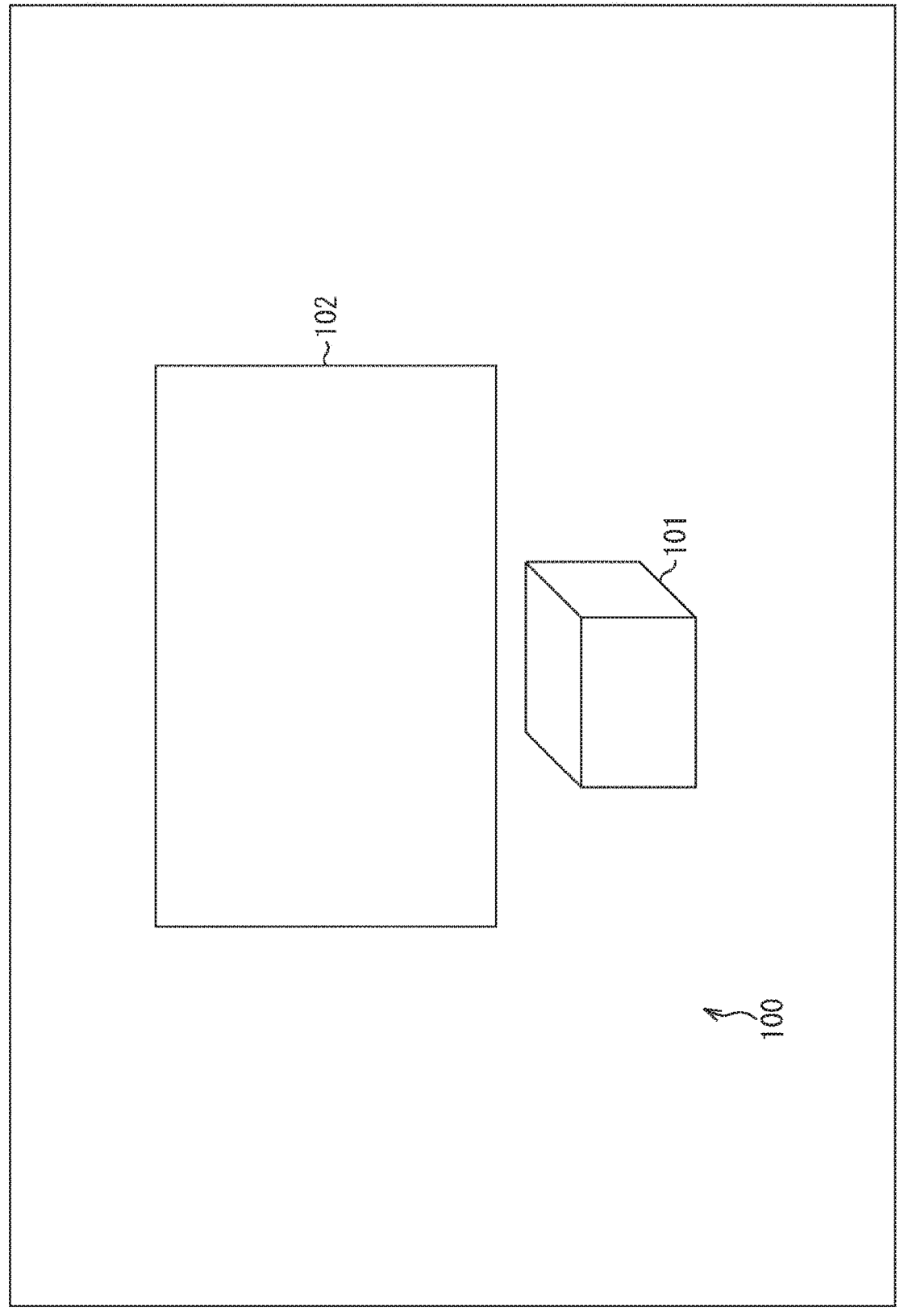
FIG. 1 is a block diagram illustrating an example of main components of a projection imaging system.

FIG. 1 is a block diagram illustrating an example of main components of one embodiment of a projection imaging system to which the present technology is applied. In FIG. 1, a projection imaging system 100 includes a projection imaging apparatus 101 and a screen 102. The projection imaging system 100 is a system that projects an image, captures an image of a projection plane, and controls an image projection position (bounds).

The projection imaging apparatus 101 is an apparatus that projects an image onto the screen 102. The projection imaging apparatus 101 is installed close to the screen 102 as is what is called an ultra-short focus projector and is designed to project an image from there onto the screen 102. For example, the projection imaging apparatus 101 is installed at a position under the screen 102 in contact or in proximity to a wall or the like to which the screen 102 is installed so as to project an image toward the screen 102 (wall) from a location at a slight distance from a housing thereof. That is, the projection imaging apparatus 101 projects an image from immediately under the screen 102.

Also, the projection imaging apparatus 101 controls the position where (the bounds within which) an image is projected. The projection imaging apparatus 101 corrects the image to be projected so as to control the image projection position. Further, the projection imaging apparatus 101 captures an image of the screen 102 onto which the image is projected (i.e., projection plane) to correct the image (control the projection position). In general, an image projected by a short focus projector is prone to distortion, and it is highly difficult to control the position thereof. The projection imaging apparatus 101 achieves image projection position control by capturing an image of the screen 102 and performing image correction by using the captured image, thus allowing the image projection position to be controlled with more ease.

It should be noted that the screen 102 includes a material or configuration that allows reflection of light forward with high luminance and in other directions with low luminance. For example, in the case where an image projected by the projection imaging apparatus 101 onto the screen 102 is viewed from front, the projected image looks highly bright. However, in the case where the projected image is viewed from directions other than the front (e.g., from under the screen 102), the projected image looks dim. The screen 102 realizes the projection plane having such a characteristic with its material or configuration.

<Projection Imaging Apparatus>

Figure 2:
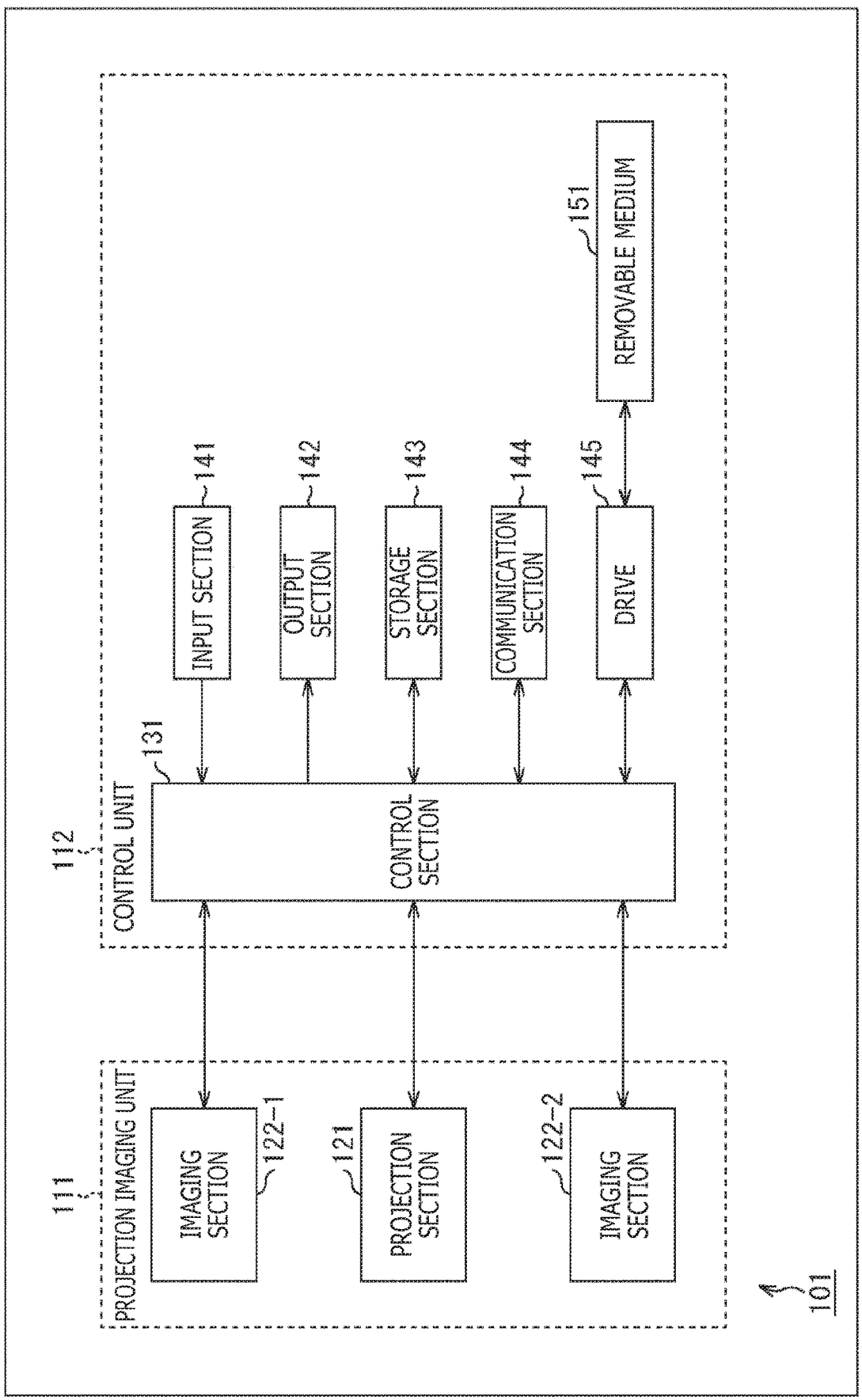
FIG. 2 is a block diagram illustrating an example of main components of a projection imaging apparatus.

FIG. 2 is a block diagram illustrating an example of main components of the projection imaging apparatus 101 that is one embodiment of the information processing apparatus to which the present technology is applied. It should be noted that only main processing sections, data flows, and the like are depicted in FIG. 2 and that not all the components of the projection imaging apparatus 101 are necessarily depicted in FIG. 2. That is, in the projection imaging apparatus 101, there may be processing sections not depicted as blocks in FIG. 2, and there may be processes and data flows not depicted as arrows and the like in FIG. 2.

As illustrated in FIG. 2, the projection imaging apparatus 101 includes a projection imaging unit 111 and a control unit 112. The projection imaging unit 111 handles processes associated with projection and image capture. The control unit 112 handles processes associated with control over the projection imaging unit 111.

The projection imaging unit 111 includes a projection section 121 and imaging sections 122-1 and 122-2.

The projection section 121 handles processes associated with image projection. For example, the projection section 121 acquires image data from the control unit 112 (control section 131 described later) and projects the image thereof onto the screen 102.

The imaging sections 122-1 and 122-2 handle processes associated with image capture. In the case where there is no need to distinguish between the imaging sections 122-1 and 122-2, the two will be referred to as the imaging sections 122. For example, the imaging sections 122 generate captured image data by capturing images of the screen 102 onto which an image is projected by the projection section 121 and its periphery. The imaging sections 122 supply the generated captured image data to the control unit 112 (control section 131 described later). It should be noted that the imaging sections 122-1 and 122-2 capture images of the screen 102 and its periphery from different positions in the housing of the projection imaging apparatus 101. That is, there is parallax between a captured image generated by the imaging section 122-1 and a captured image generated by the imaging section 122-2.

The control unit 112 includes the control section 131, an input section 141, an output section 142, a storage section 143, a communication section 144, and a drive 145.

The control section 131 handles processes associated with control over the projection imaging unit 111. For example, the control section 131 supplies image data to the projection section 121, thus causing the image thereof to be projected. Also, the control section 131 acquires captured image data by causing the imaging section 122 to capture an image.

Further, the control section 131 corrects the image to be projected by the projection section 121 by use of the captured image, thus controlling the position (bounds) of the image projected by the projection section 121. For example, the control section 131 controls the image projection position (bounds) such that the bounds of the image projected by the projection section 121 match those of the screen 102 (such that an outer frame of the projected image matches that of the screen 102).

It should be noted that although configured in any manner, the control section 131 may include a CPU (Central Processing Unit), a ROM (Read Only Memory), a RAM (Random Access Memory), and the like and carry out processes as the CPU loads programs and data stored in the ROM or the like into the RAM for execution, for example.

The input section 141 handles processes associated with receipt of information input from external equipment. For example, the input section 141 receives information input from external equipment and supplies the information to the control section 131. The input section 141 includes any input device that receives external information such as user input. The input device may be, for example, a keyboard, a mouse, an operating button, a touch panel, a camera, a microphone, or an input terminal. Also, the input device may be one of a variety of sensors such as an acceleration sensor, an optical sensor, and a temperature sensor, or input equipment such as a barcode reader. The input section 141 may include a plurality of input devices or a plurality of types of input devices.

The output section 142 handles processes associated with information output. For example, the output section 142 outputs information supplied from the control section 131 to equipment external to the projection imaging apparatus 101. The output section 142 includes any output device that outputs information such as images and sounds. The output device may be, for example, a display, a speaker, an output terminal, or the like. The output section 142 may include a plurality of output devices or a plurality of types of input devices.

The storage section 143 handles processes associated with information storage. For example, the storage section 143 stores information supplied from the control section 131. Also, the storage section 143 supplies information stored therein to the control section 131. The storage section 143 includes any storage medium that stores information such as programs and data. The storage medium may be, for example, a hard disk, a RAM disk, a non-volatile memory, or the like. The storage section 143 may include a plurality of storage media or a plurality of types of storage media.

The communication section 144 handles processes associated with communication. For example, the communication section 144 communicates with an apparatus external to the projection imaging apparatus 101, supplying information (e.g., programs and data) supplied from the control section 131 to the external apparatus. Also, the communication section 144 communicates with an apparatus external to the projection imaging apparatus 101, acquiring information (e.g., programs and data) from the external apparatus and supplying the acquired information to the control section 131. The communication section 144 includes any communication device for communicating with an external apparatus via a given communication medium (e.g., any network such as the Internet) and exchanging information such as programs and data. The communication device may be, for example, a network interface. The communication section 144 may include a plurality of communication devices or a plurality of types of communication devices. It should be noted that the communication section 144 may have a wired or wireless communication function or both thereof.

The drive 145 handles processes associated with an interface of a removable medium 151 inserted therein. For example, the drive 145 reads out information (e.g., programs and data) that is recorded in the removable medium 151 inserted therein, supplying the information to the control section 131. Also, in the case where the writable removable medium 151 is inserted in the drive 145, the drive 145 writes (stores) information (e.g., programs and data) supplied from the control section 131 to (in) the removable medium 151. The optional removable medium 151 may be, for example, a magnetic disk, an optical disc, a magneto-optical disk, a semiconductor memory, or the like. The drive 145 may allow insertion of the plurality of removable media 151 or the plurality of types of removable media 151.

<Functional Blocks of the Control Section>

Figure 3:
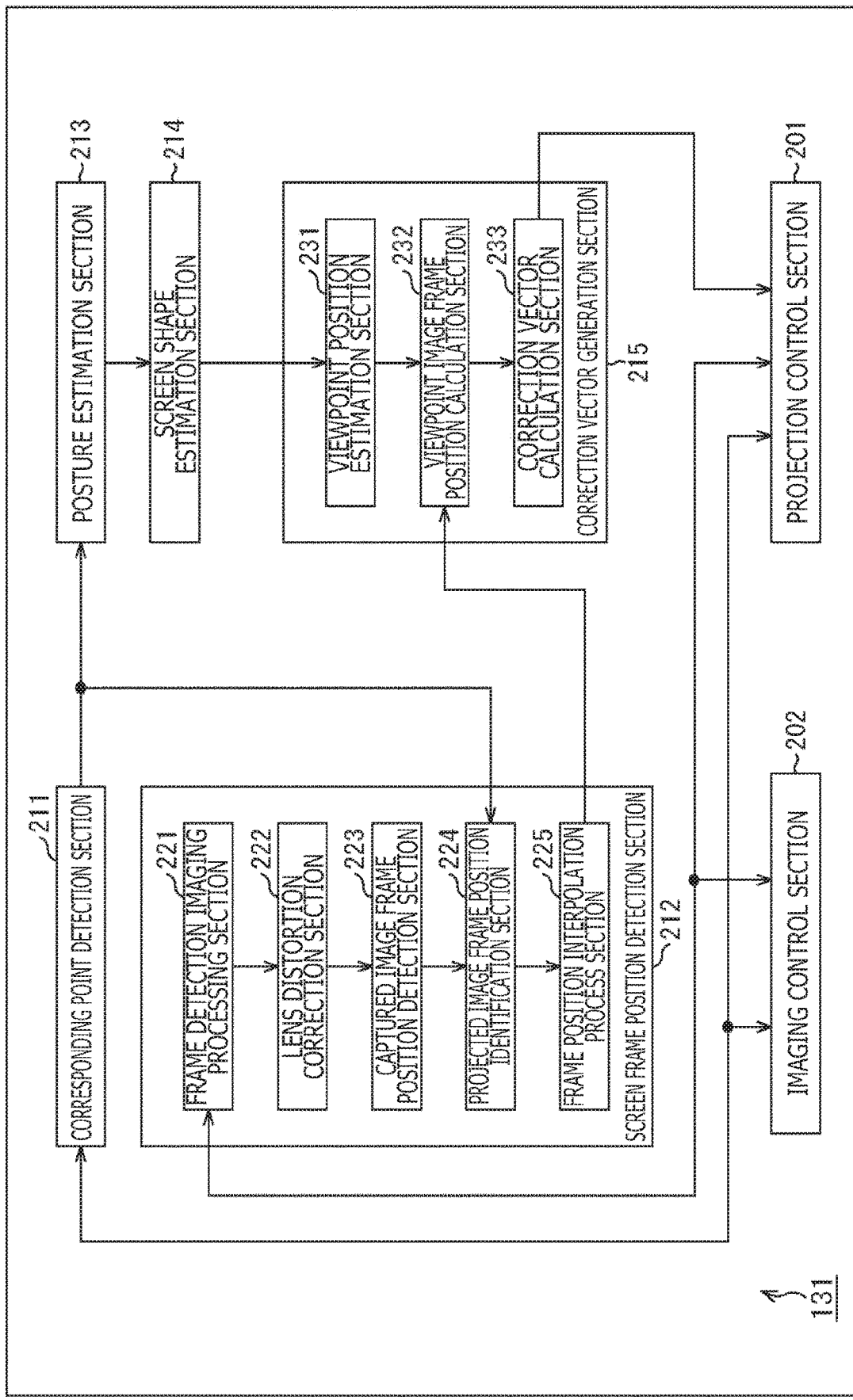
FIG. 3 is a functional block diagram illustrating an example of main functions realized by a control section.

FIG. 3 is a functional block diagram illustrating an example of functions realized as a result of execution of programs by the control section 131. As illustrated in FIG. 3, the control section 131 provides, for example, functions of a projection control section 201, an imaging control section 202, a corresponding point detection section 211, a screen frame position detection section 212, a posture estimation section 213, a screen shape estimation section 214, and a correction vector generation section 215 by executing programs.

The projection control section 201 handles processes associated with control over the projection section 121. For example, the projection control section 201 supplies image data to the projection section 121, thus causing the image thereof to be projected. For example, in the case where the user views content, the projection control section 201 supplies image data of the content to the projection section 121, thus causing the image thereof to be projected. Also, in the case of detecting corresponding points between the projection section 121 and the imaging section 122 (corresponding points between an image to be projected and a captured image), the projection control section 201 supplies image data for detecting the corresponding points to the projection section 121 in response to a request from the corresponding point detection section 211, thus causing the image thereof to be projected. Also, in the case of detecting a frame position of the screen 102, the projection control section 201 supplies image data for detecting the screen frame position to the projection section 121 in response to a request from the screen frame position detection section 212 (frame detection imaging processing section 221), thus causing the image thereof to be projected.

Also, for example, the projection control section 201 subjects the image to be supplied to the projection section 121 to a correction process for controlling the image projection position or correcting distortion of the projected image. For example, the projection control section 201 performs the correction process by using a correction vector supplied from the correction vector generation section 215 (correction vector calculation section 233).

The imaging control section 202 handles processes associated with control over the imaging section 122. For example, in the case of detecting corresponding points between the projection section 121 and the imaging section 122 (corresponding points between an image to be projected and a captured image), the imaging control section 202 controls, in response to a request from the corresponding point detection section 211, the imaging section 122 to capture an image of the screen 102 onto which an image is projected from the projection section 121 and its periphery and generate captured image data, thus acquiring the data. The imaging control section 202 supplies the acquired captured image data to the corresponding point detection section 211. Also, in the case of detecting the frame position of the screen 102, the imaging control section 202 controls, in response to a request from the screen frame position detection section 212 (frame detection imaging processing section 221), the imaging section 122 to capture an image of the screen 102 onto which an image is projected from the projection section 121 and its periphery and generate captured image data, thus acquiring the data. The imaging control section 202 supplies the acquired captured image data to the screen frame position detection section 212 (frame detection imaging processing section 221).

The frame detection imaging processing section 221 handles processes associated with detection of corresponding points between the projection section 121 and the imaging section 122 (corresponding points between an image to be projected and a captured image). For example, the frame detection imaging processing section 221 controls the projection section 121 via the projection control section 201, supplying image data for corresponding point detection and causing the image thereof to be projected. Also, the frame detection imaging processing section 221 controls the imaging section 122 via the imaging control section 202, causing the imaging section 122 to capture an image of the screen 102 onto which the image for corresponding point detection is projected and its periphery and acquiring captured image data thereof.

The corresponding point detection section 211 detects corresponding points by using the acquired captured image data and the like, supplying the detection result thereof to the posture estimation section 213 and a projected image frame position identification section 224 of the screen frame position detection section 212.

The screen frame position detection section 212 handles processes associated with detection of a screen frame position. For example, the screen frame position detection section 212 detects the frame position of the screen 102, supplying the detection result thereof to the correction vector generation section 215 (viewpoint image frame position calculation section 232).

The posture estimation section 213 handles processes associated with posture estimation. For example, the posture estimation section 213 estimates the postures of the projection section 121 and the imaging section 122 by using the corresponding points detected by the corresponding point detection section 211, supplying the estimation result thereof to the screen shape estimation section 214.

The screen shape estimation section 214 handles processes associated with screen shape estimation. For example, the screen shape estimation section 214 estimates the shape of the screen 102 on the basis of the postures of the projection section 121 and the imaging section 122 estimated by the posture estimation section 213, supplying the estimation result thereof to the correction vector generation section 215 (viewpoint position estimation section 231).

The correction vector generation section 215 handles processes associated with generation of a correction vector. The correction vector is vector information indicating details of image correction for controlling the image projection position (bounds) and reducing distortion. That is, a correction vector is information indicating how to correct each pixel of the image to be projected by the projection section 121 so as to control the image projection position (bounds) and reduce distortion. For example, the correction vector generation section 215 generates a correction vector on the basis of information such as the screen shape estimated by the screen shape estimation section 214, the frame position of the screen 102 detected by the screen frame position detection section 212, and the like.

The correction vector generation section 215 supplies the generated correction vector to the projection control section 201. As described above, the projection control section 201 performs image correction by using the correction vector.

Also, the screen frame position detection section 212 includes the frame detection imaging processing section 221, a lens distortion correction section 222, a captured image frame position detection section 223, the projected image frame position identification section 224, and a frame position interpolation process section 225.

The frame detection imaging processing section 221 handles processes associated with image capture for detecting a screen frame. For example, the frame detection imaging processing section 221 controls the projection section 121 via the projection control section 201, supplying image data for detecting the screen frame position and causing the image thereof to be projected. Also, the frame detection imaging processing section 221 controls the imaging section 122 via the imaging control section 202, causing the imaging section 122 to capture an image of the screen 102 onto which the image for detecting the screen frame position is projected from the projection section 121 and its periphery and generate captured image data and acquiring the data thereof. Also, the frame detection imaging processing section 221 supplies the acquired captured image data to the lens distortion correction section 222.

The lens distortion correction section 222 handles processes associated with lens distortion correction. For example, the lens distortion correction section 222 corrects lens distortion of the captured image supplied from the frame detection imaging processing section 221, supplying the corrected captured image to the captured image frame position detection section 223.

The captured image frame position detection section 223 handles processes associated with screen frame position detection in a captured image. For example, the captured image frame position detection section 223 detects, by using a captured image whose lens distortion has been corrected by the lens distortion correction section 222, the frame position of the screen 102 in the captured image, supplying the detection result thereof to the projected image frame position identification section 224.

The projected image frame position identification section 224 handles processes associated with screen frame position detection in an image to be projected. For example, the projected image frame position identification section 224 transforms the frame position of the screen 102 in the captured image that is detected by the captured image frame position detection section 223 into a frame position in the image to be projected, by use of the corresponding points detected by the corresponding point detection section 211, thus identifying the frame position of the screen 102 in the image to be projected. The projected image frame position identification section 224 supplies information indicating the identified frame position of the screen 102 to the frame position interpolation process section 225.

The frame position interpolation process section 225 handles processes associated with interpolation of the screen frame position identified by the projected image frame position identification section 224. For example, the frame position interpolation process section 225 performs interpolation between local screen frame positions identified by the projected image frame position identification section 224 by a given interpolation technique. The frame position interpolation process section 225 supplies, to the correction vector generation section 215 (viewpoint image frame position calculation section 232), information indicating the frame position of the screen 102 after the interpolation process.

The correction vector generation section 215 includes the viewpoint position estimation section 231, the viewpoint image frame position calculation section 232, and the correction vector calculation section 233.

The viewpoint position estimation section 231 handles processes associated with viewpoint position estimation. For example, the viewpoint position estimation section 231 estimates a user's viewpoint position (e.g., front side of the screen 102) on the basis of the screen shape estimated by the screen shape estimation section 214. The viewpoint position estimation section 231 supplies information indicating the estimated position to the viewpoint image frame position calculation section 232.

The viewpoint image frame position calculation section 232 handles processes associated with calculation of a screen frame position in a viewpoint image indicating how much is visible from the viewpoint position (field of view). For example, the viewpoint image frame position calculation section 232 estimates a viewpoint image at the viewpoint position estimated by the viewpoint position estimation section 231 and calculates, with respect to the viewpoint image, the frame position of the screen 102 indicated in information supplied from the frame position interpolation process section 225, supplying the calculation result thereof to the correction vector calculation section 233.

The correction vector calculation section 233 handles processes associated with correction vector calculation. For example, the correction vector calculation section 233 calculates a correction vector by using the frame position of the screen 102 in the viewpoint image calculated by the viewpoint image frame position calculation section 232. The correction vector calculation section 233 supplies the calculated correction vector to the projection control section 201.

<Flow of the Projection Correction Process>

A description will be given next of an example of a flow of a projection correction process performed by the projection imaging apparatus 101 configured as described above with reference to the flowchart in FIG. 4. It should be noted that the process may be performed during projection of content or when no content is projected.

When the projection correction process begins, the corresponding point detection section 211 detects corresponding points between a projected image and a captured image in step S101. Any technique may be used to detect the corresponding points. For example, the technique disclosed in PCT Patent Publication No. WO2017/104447 may be used. It should be noted that content viewing may be suspended when corresponding points are detected so as to acquire the corresponding points by emitting a structured light pattern.

In step S102, the screen frame position detection section 212 detects the frame position of the screen 102.

In step S103, the posture estimation section 213 estimates the postures of the projection section 121 and the imaging section 122 by using the corresponding points acquired in step S101.

In step S104, the screen shape estimation section 214 estimates the screen shape on the basis of the posture estimation result in step S103.

In step S105, the correction vector generation section 215 estimates a correction vector by using the screen shape estimated in step S104.

When the process in step S105 ends, the projection correction process ends.

<Flow of the Screen Frame Position Detection Process>

A description will be given next of an example of a flow of the screen frame position detection process performed in step S102 in FIG. 4 with reference to the flowchart in FIG. 5.

When the screen frame position detection process begins, the frame detection imaging processing section 221 selects the target imaging section 122 in step S121. In the case where there is only one imaging section 122, the process is omitted.

In step S122, the frame detection imaging processing section 221 causes the projection section 121 to project an image for detecting a screen frame position and the imaging section 122 to capture an image of the projection plane thereof, thus generating the captured image for detecting a screen frame position.

Figure 6:
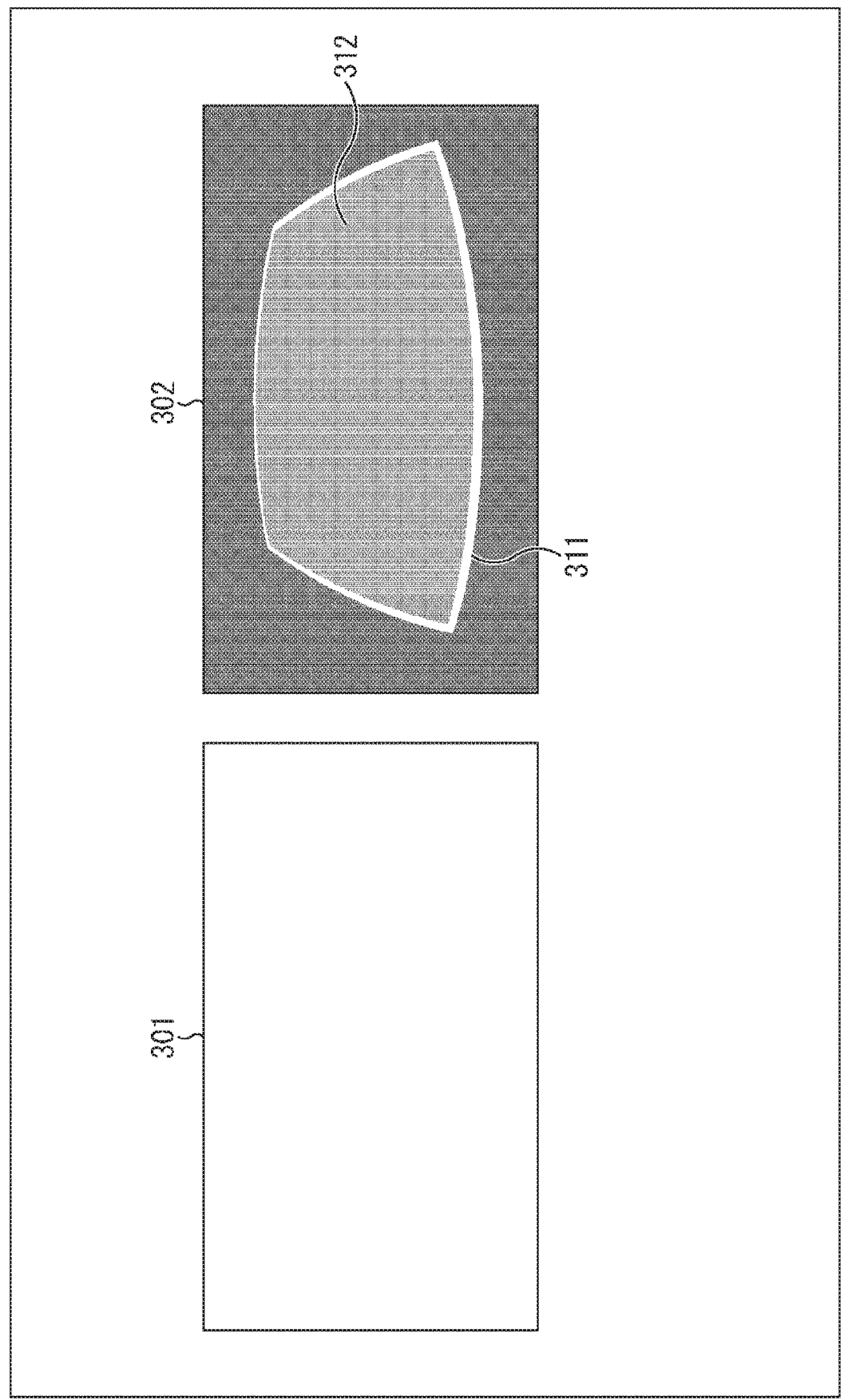
FIG. 6 is a diagram illustrating an example of an image for detecting a screen frame position and an example of a captured image of a screen frame position.

FIG. 6 illustrates an example of a projected image for detecting a screen frame position and an example of a captured image for detecting a screen frame position. A projected image 301 for detecting a screen frame position illustrated in FIG. 6 depicts an example of an image projected by the projection section 121. In this case, the projected image 301 for detecting a screen frame position is what is called a white image all of whose pixels are set to a maximum luminance level. That is, the projection section 121 projects such a uniformly white image as a projected image for detecting a screen frame position.

It should be noted that the projected image 301 for detecting a screen frame position is not limited in luminance level to the example in FIG. 6. For example, it is acceptable as long as the projected image 301 for detecting a screen frame position has a uniform luminance level, and there is no need for the projected image 301 to have the maximum luminance level. That is, the projected image 301 for detecting a screen frame position may be an image of a color other than white. Also, it is acceptable as long as the projected image 301 for detecting a screen frame position has a uniform luminance level at its exterior (in the vicinity of the frame), and there is no need for the projected image 301 to have a uniform luminance level in the center.

The imaging section 122 captures an image of the screen 102 onto which the projected image 301 for detecting a screen frame position is projected and its periphery, thus acquiring a captured image 302 for detecting a screen frame position.

A projected image 311 included in the captured image 302 for detecting a screen frame position is the projected image 301 for detecting a screen frame position projected onto the screen 102 or the like by the projection section 121. A region 312 in the projected image 311 is lower in luminance than its periphery. The reason for this is that the screen 102 reflects light forward with high luminance and that less light is reflected in other directions (in the direction where the projection imaging apparatus 101 is installed) than by the periphery of the screen 102.

The projection imaging apparatus 101 detects the frame of the screen 102 by using such a difference in luminance. That is, the projection imaging apparatus 101 identifies the frame position of the screen 102 by using the difference between a light intensity with which an all-white pattern emitted from the projection section 121 enters the imaging section 122 after having been reflected by the screen 102 and a light intensity with which the pattern enters the imaging section 122 after having been reflected by the exterior of the screen 102 (e.g., wall).

It should be noted that the imaging section 122 captures images with a wide-angle lens to ensure that the entire screen 102 fits within an imaging angle of view. For this reason, the captured image 302 for detecting a screen frame position has lens distortion, changing a straight line in a real space into a curve in the captured image 302 for detecting a screen frame position.

For this reason, the lens distortion correction section 222 applies, in step S123, lens distortion correction to the captured image 302 for detecting a screen frame position generated in step S122, by using a known lens distortion parameter from advance calibration, thus reducing such lens distortion. Further, the lens distortion correction section 222 transforms the image into a gray image.

Figure 7:
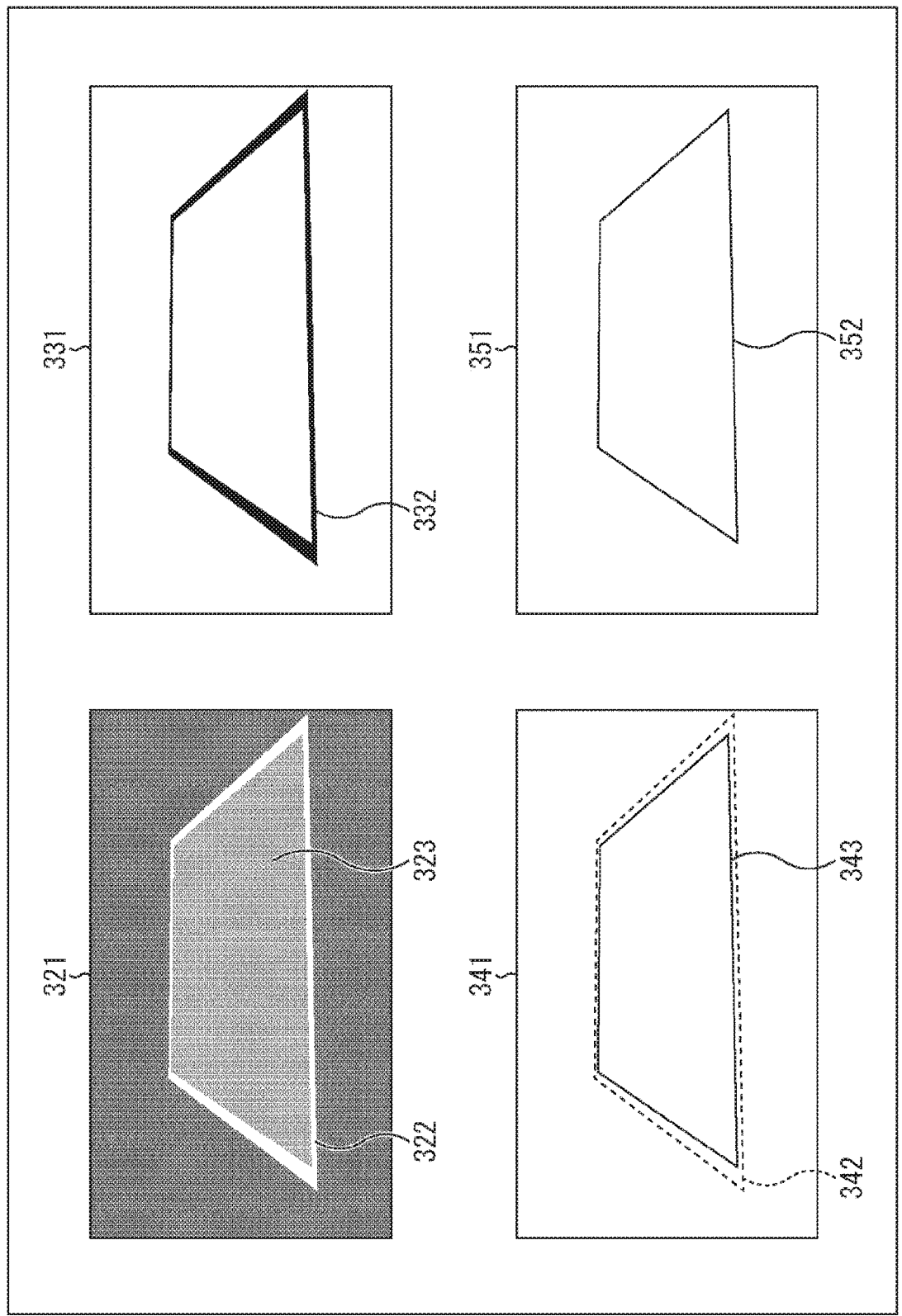
FIG. 7 is a diagram illustrating an example of a manner in which a screen frame position is detected.

A captured image 321 illustrated in FIG. 7 is acquired as a result of the processes. A projected image 322 in the captured image 321 corresponds to the projected image 311 (FIG. 6) of the captured image 302 for detecting a screen frame position. Also, a region 323 with lower luminance than its periphery in the projected image 322 corresponds to the region 312 in the captured image 302 for detecting a screen frame position. As described above, curved contours of the projected image 311 and the region 312 are transformed into straight lines as a result of lens distortion correction.

In step S124, the captured image frame position detection section 223 detects a screen frame position in the captured image.

More specifically, the captured image frame position detection section 223 binarizes the captured image 321 first, thus transforming the image into a binary image 331. In the binary image 331, only a region outside the screen 102 onto which the projected image 301 for detecting a screen frame position is projected, the region having high luminance in the captured image 321, is represented as a black region 332 as illustrated in FIG. 7. That is, such binarization clarifies the difference in luminance between the region of the screen 102 and the region outside the screen 102.

Next, the captured image frame position detection section 223 performs contour detection in the binary image 331, thus detecting a contour of the black region 332. An image 341 in FIG. 7 depicts an example of a result of the contour detection. As illustrated in the image 341, an outer contour (dotted line frame 342) and an inner contour (solid line frame 343) of the black region 332 are both detected. The dotted line frame 342 corresponds to the contour of the projected image 301 for detecting a screen frame position. Also, the solid line frame 343 corresponds to the contour of the screen 102.

Next, the captured image frame position detection section 223 identifies the contour of the screen 102 in the image 341 on the basis of a length of the contour of the screen 102 that is approximately known in advance. That is, the solid line frame 343 is identified. An image 351 in FIG. 7 depicts the identification result. A contour 352 in the image 351 corresponds to the solid line frame 343 of the image 341.

The frame position of the screen 102 in a captured image is detected as described above.

Figure 4:
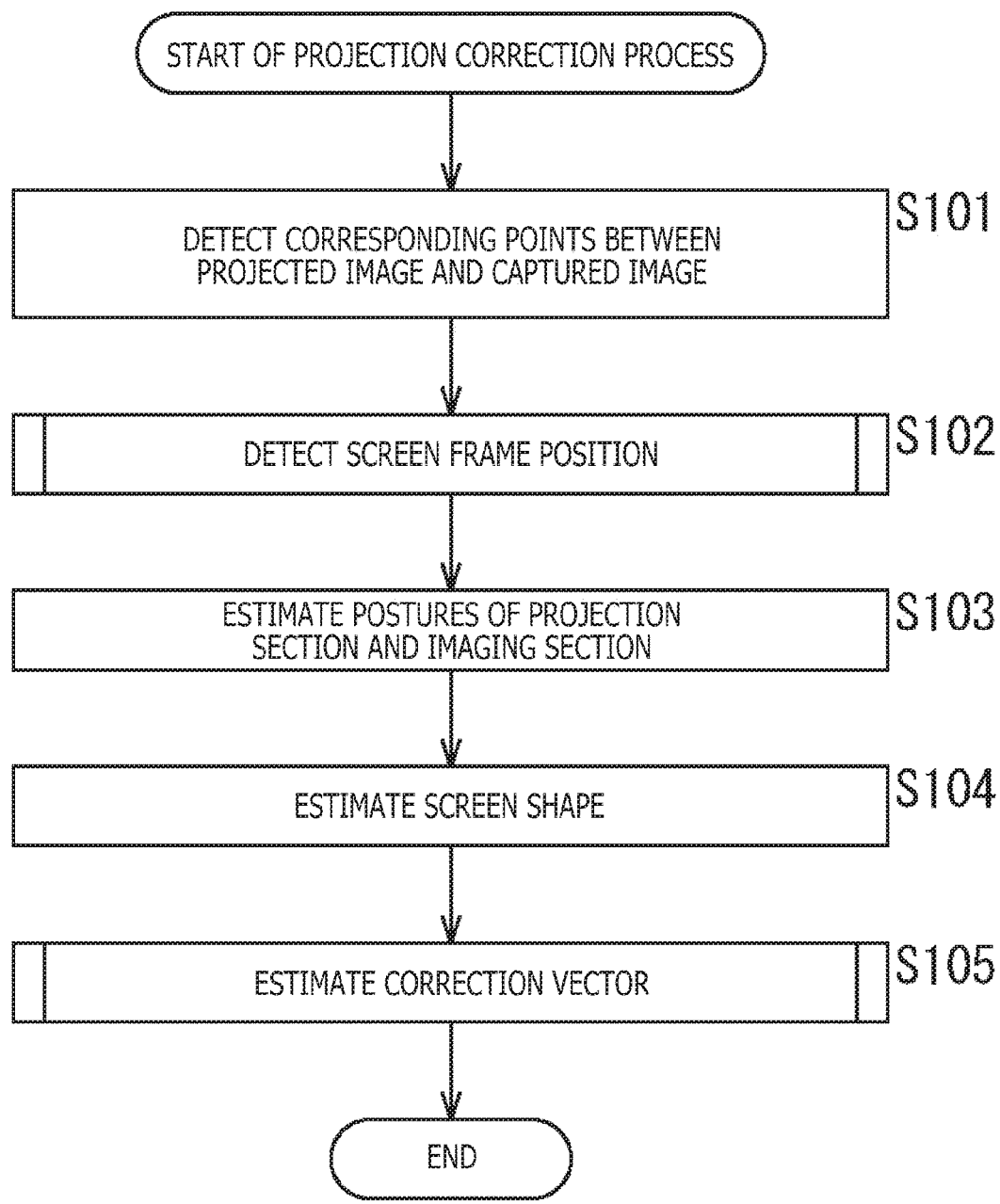
FIG. 4 is a flowchart describing an example of a flow of a projection correction process.
Figure 5:
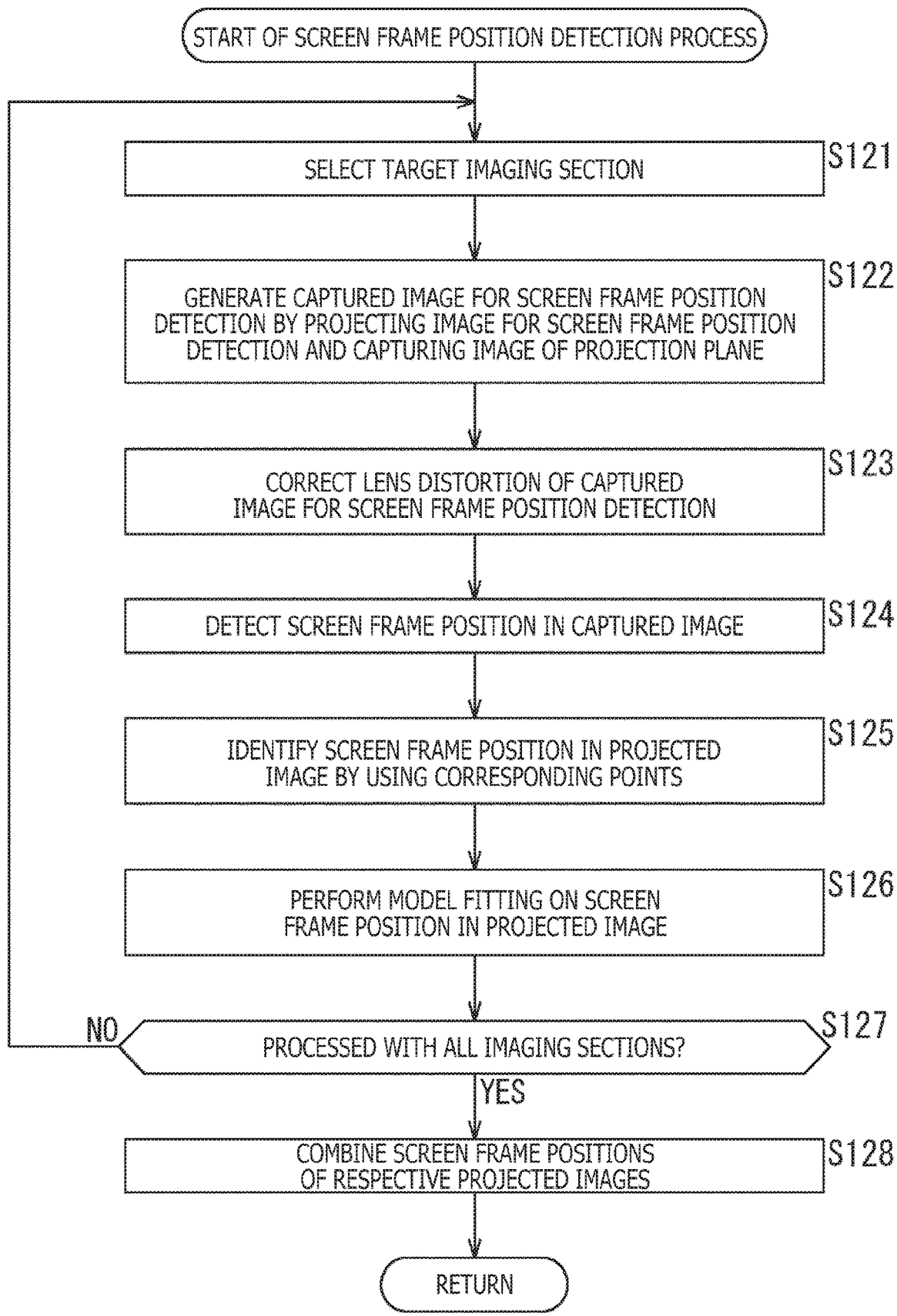
FIG. 5 is a flowchart describing an example of a flow of a screen frame position detection process.

In step S125, the projected image frame position identification section 224 identifies the screen frame position in the projected image by using the corresponding points detected in step S101 in FIG. 4. That is, the projected image frame position identification section 224 transforms the frame position of the screen 102 in the captured image detected as described above into a frame position in the projected image, by using the corresponding points.

Figure 8:
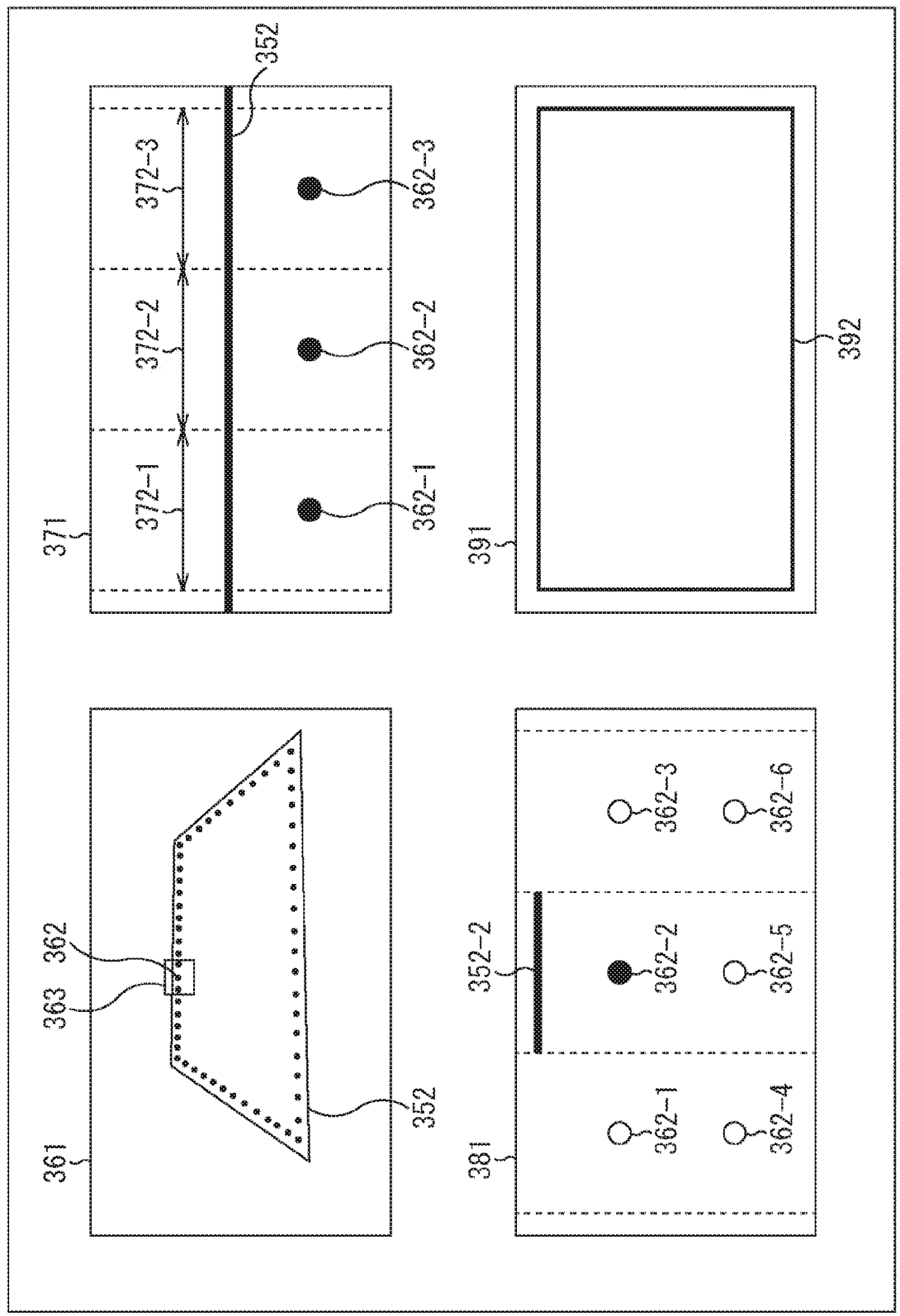
FIG. 8 is a diagram illustrating an example of a manner in which a screen frame position is detected.

First, the projected image frame position identification section 224 regards the detected contour 352 as a set of points (also referred to as contour points), identifying a corresponding point 362 on the captured image closest to each of the contour points and linking the contour points to the corresponding point 362 as illustrated in an image 361 in FIG. 8.

An image 371 in FIG. 8 is an enlarged image of a partial region 363 of the image 361. It is assumed, as illustrated in the image 371, that there are corresponding points 362-1, 362-2, and 362-3 in the vicinity of the contour 352. The corresponding point 362-1 is closest to the contour points within bounds 372-1, with respect to the partial contour 352 in the image 371. Therefore, the contour points are linked to the corresponding point 362-1. Also, the corresponding point 362-2 is closest to the contour points within bounds 372-2. Therefore, the contour points are linked to the corresponding point 362-2. Similarly, the corresponding point 362-3 is closest to the contour points within bounds 372-3. Therefore, the contour points are linked to the corresponding point 362-3.

Next, the projected image frame position identification section 224 detects corresponding points in the periphery of the linked corresponding point, grouping the points together. As illustrated in an image 381 in FIG. 8, for example, the corresponding point 362-1, the corresponding point 362-3, a corresponding point 362-4, a corresponding point 362-5, and a corresponding point 362-6 are grouped together in relation to the corresponding point 362-2 linked to a contour point group 352-2.

The projected image frame position identification section 224 obtains homographic transformation between the captured image and the projected image by using the grouped corresponding points. Then, the projected image frame position identification section 224 applies the homographic transformation to each of the contour points linked to the corresponding point, thus transforming the contour points into coordinates of a projected image.

For example, in the case of the image 381, the projected image frame position identification section 224 obtains its homographic transformation by using the grouped corresponding points 362-1 to 362-6. Then, the projected image frame position identification section 224 applies the homographic transformation to the contour point group 352-2 linked to the corresponding point 362-2, thus transforming the contour points into coordinates of a projected image.

The projected image frame position identification section 224 transforms the contour 352 into a contour in a projected image by applying such a process to all the contour points. An image 391 in FIG. 8 depicts an example of a frame position of the screen 102 of the projected image obtained in this manner. That is, the image 391 corresponds to the projected image, and a solid line frame 392 corresponds to the contour 352 transformed into the contour in the projected image.

In step S126, the frame position interpolation process section 225 performs model fitting on the screen frame position in the projected image identified in step S125, thus conducting interpolation between screen frame positions.

Figure 9:
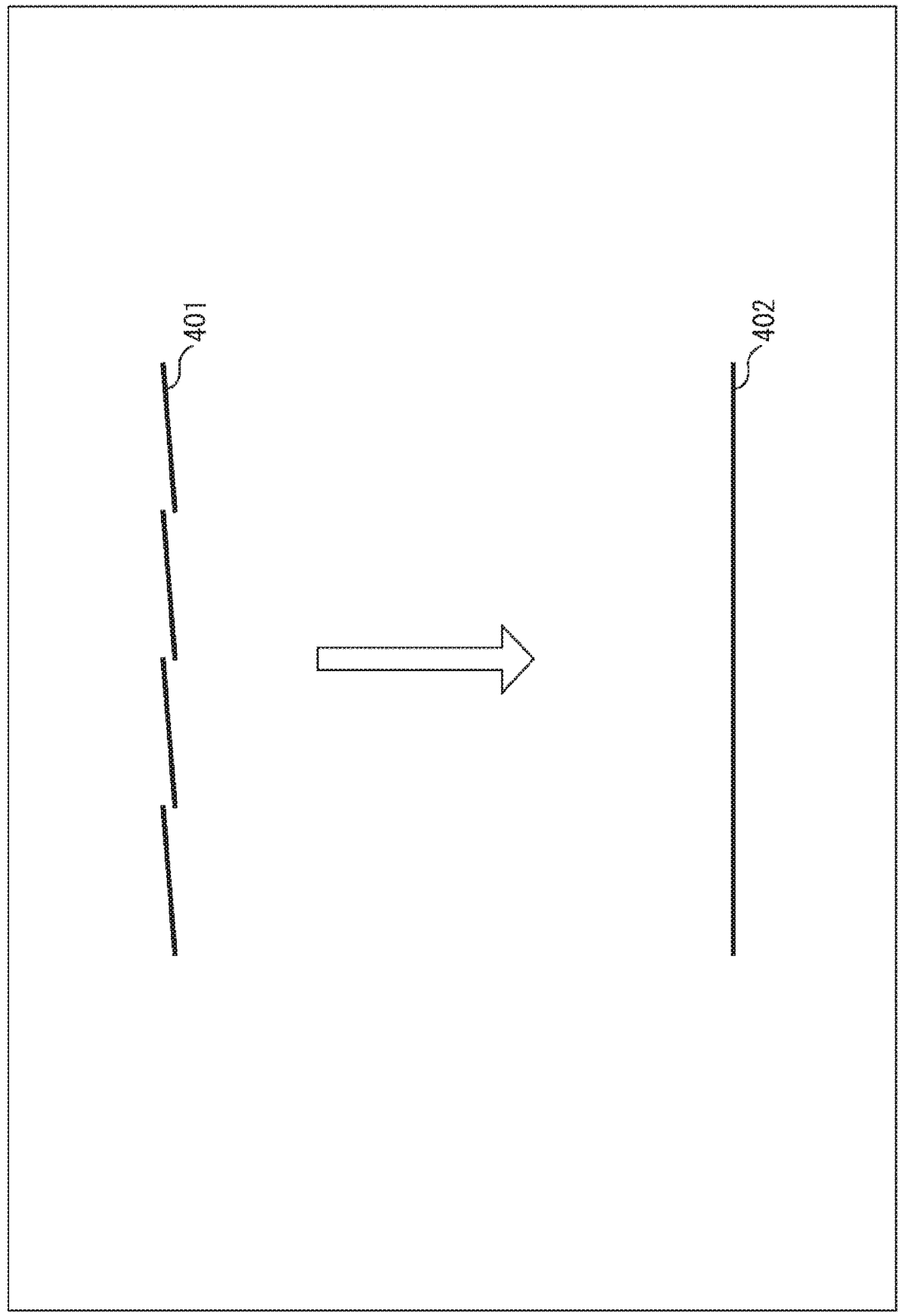
FIG. 9 is a diagram illustrating an example of a manner in which a screen frame position is detected.

As described above, the transformation of the contour 352 into a contour in a projected image is carried out for each local portion, possibly changing the solid line frame 392 into a jaggy contour 401 (contour with discontinuities) as illustrated in FIG. 9 due to noise impact or the like. For this reason, the frame position interpolation process section 225 performs model fitting on the screen frame position, thus conducting interpolation between screen frame positions and transforming the contour 401 into a contour 402. Any technique may be used for interpolation. For example, B-spline interpolation may be applied. It is possible to keep, to a minimum, noise impact by applying such an interpolation technique and connecting the screen frame positions smoothly.

In step S127, the screen frame position detection section 212 determines whether or not the process is complete for all the imaging sections 122. In the case where it is determined that there are still the imaging sections 122 yet to be processed, the process returns to step S121 to repeat the subsequent processes. That is, the above processes are repeated for each imaging section 122.

Then, in the case where it is determined in step S127 that the process is complete for all the imaging sections 122, the process proceeds to step S128.

In step S128, the screen frame position detection section 212 combines the frame positions of the screen 102 in the projected image detected on the basis of the respective captured images. Any technique may be used to combine the frame positions. For example, a mean of the respective frame positions of the screen 102 detected in the projected image or a median thereof may be used as a final frame position.

When the process in step S128 ends, the screen frame position detection process ends, and the process returns to FIG. 4.

<Flow of the Correction Vector Generation Process>

Figure 10:
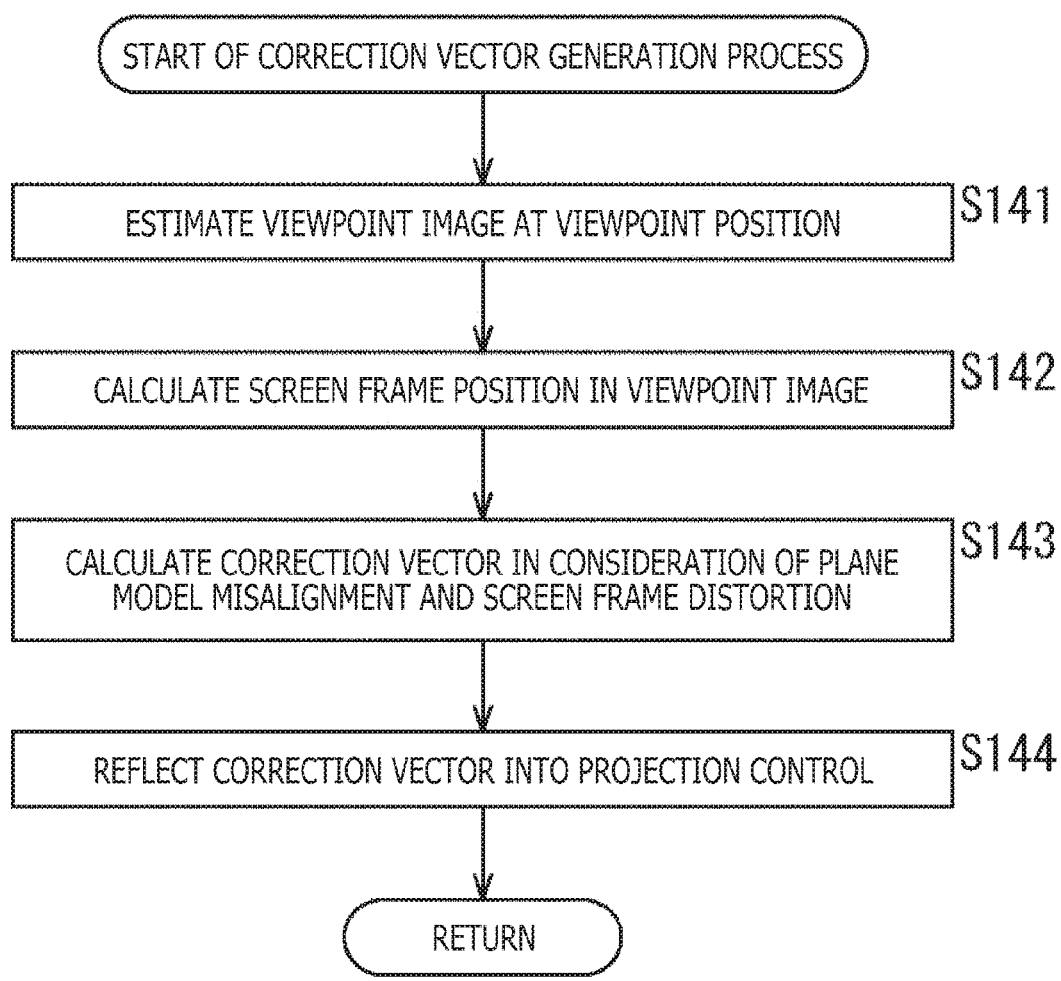
FIG. 10 is a flowchart describing an example of a flow of a correction vector generation process.

A description will be given next of an example of a flow of a correction vector generation process performed in step S105 in FIG. 4 with reference to the flowchart in FIG. 10.

When the correction vector generation process begins, the viewpoint position estimation section 231 of the correction vector generation section 215 estimates a viewpoint image at a viewpoint position in step S141.

The viewpoint image refers to an image indicating how much is visible from a viewpoint position (field of view), i.e., a virtual image equivalent to a captured image obtained by capturing an image of the screen 102 and its periphery from the viewpoint position. Also, the viewpoint position refers to a viewpoint position of a user viewing the projected image, and any position can be specifically set as a viewpoint position. It is assumed here that the viewpoint position is located forward from the screen 102 at a given distance.

A correction vector is calculated by using such a viewpoint image. That is, the projection imaging apparatus 101 calculates the correction vector such that the position (bounds) of the projected image as seen from the user agrees with the position (bounds) of the screen 102.

In step S142, the viewpoint image frame position calculation section 232 calculates the screen frame position in the viewpoint image. As described above, the frame position of the screen 102 in each of the captured images and each of the projected images is obtained. This makes it possible to obtain the frame position of the screen 102 in the viewpoint image.

In step S143, the correction vector calculation section 233 calculates a correction vector in consideration of plane model misalignment and screen frame distortion. Because of a potential risk of error attributable to actual environmental impacts, the correction vector calculation section 233 calculates the correction vector in consideration of such an error.

Figure 11:
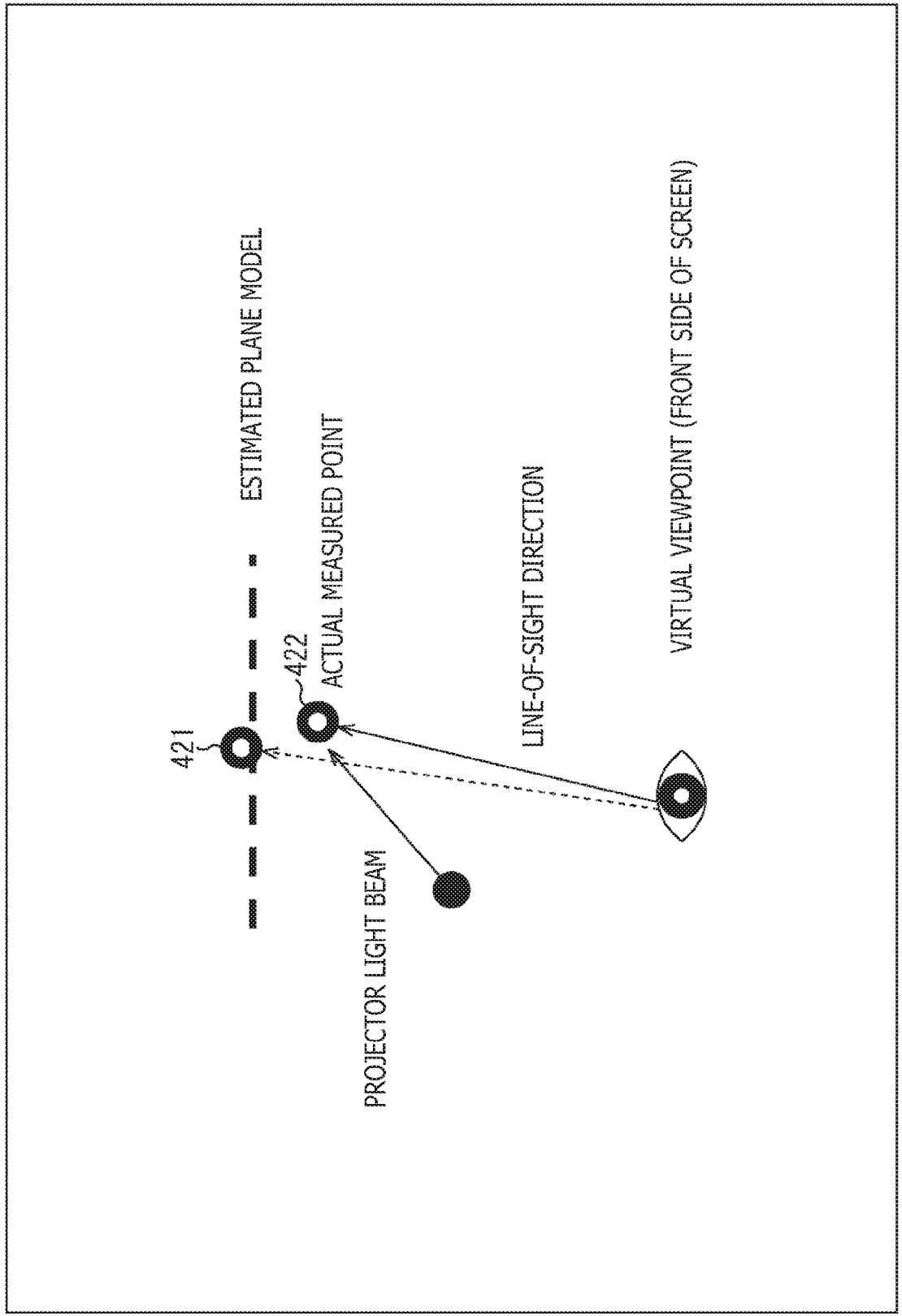
FIG. 11 is a diagram illustrating an example of a manner in which a correction vector is generated.

For example, as illustrated in FIG. 11, the estimated position of the screen 102 (plane model) may be misaligned from the actual position. Such an error (plane model misalignment) may lead to a difference between the position of a certain pixel 421 in the projected image assumed on an estimated plane and the position of an actual measured point 422 that has actually been measured.

For this reason, the correction vector calculation section 233 calculates a correction vector to reduce such a plane model misalignment.

Figure 12:
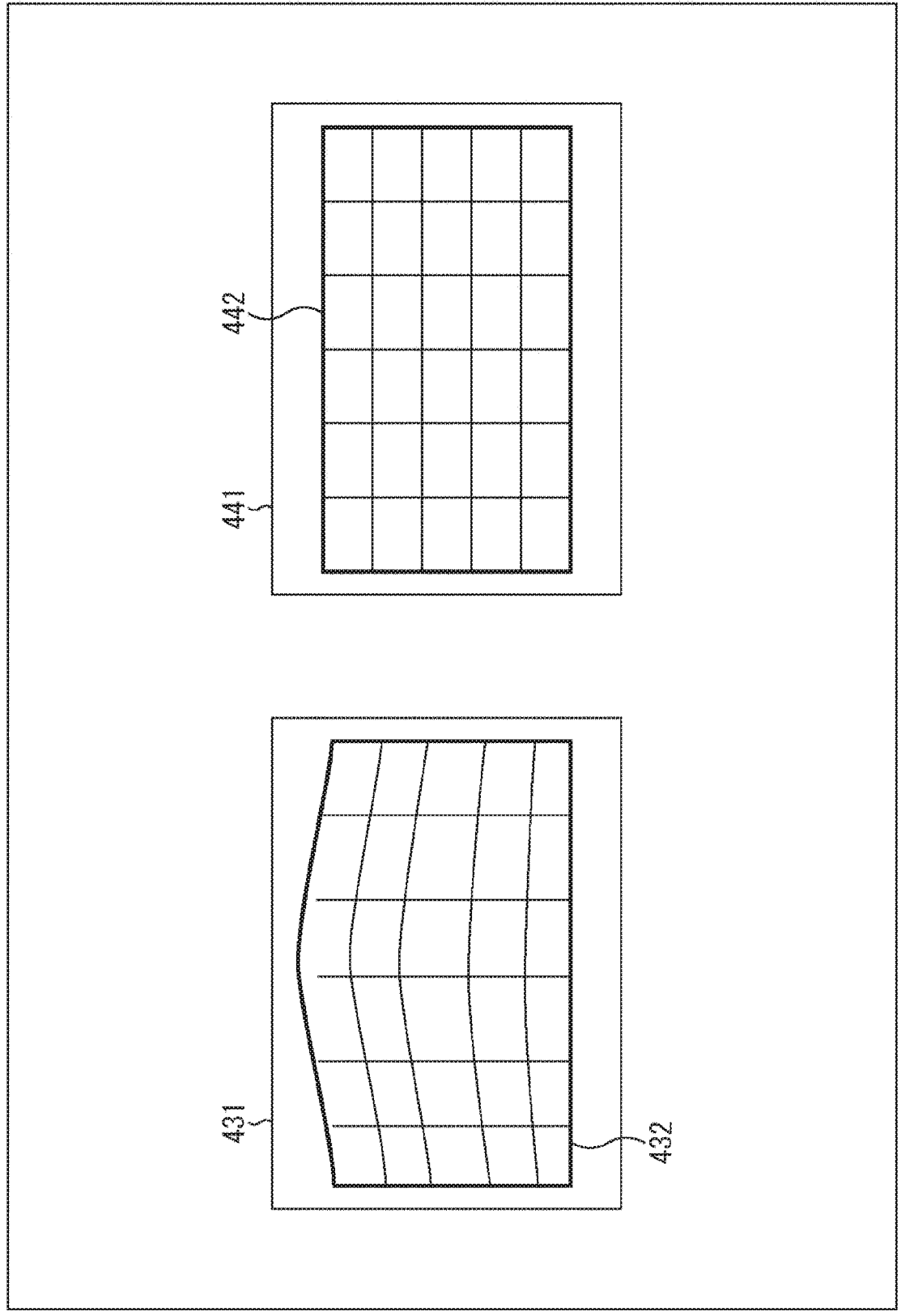
FIG. 12 is a diagram illustrating an example of a manner in which a correction vector is generated.

Also, the frame position of the screen 102 in the projected image obtained as described above may become distorted (screen frame distortion) as does a frame position 432 of a projected image 431 illustrated in FIG. 12.

For this reason, the correction vector calculation section 233 calculates a correction vector such that distortion diminishes as depicted by a frame position 442 in a viewpoint image 441.

At this time, the correction vector calculation section 233 calculates a correction vector not only to tidy up the shape of the frame (outer shape of the projected image) but also to correct the distortion of the projected image as a whole.

Figure 13:
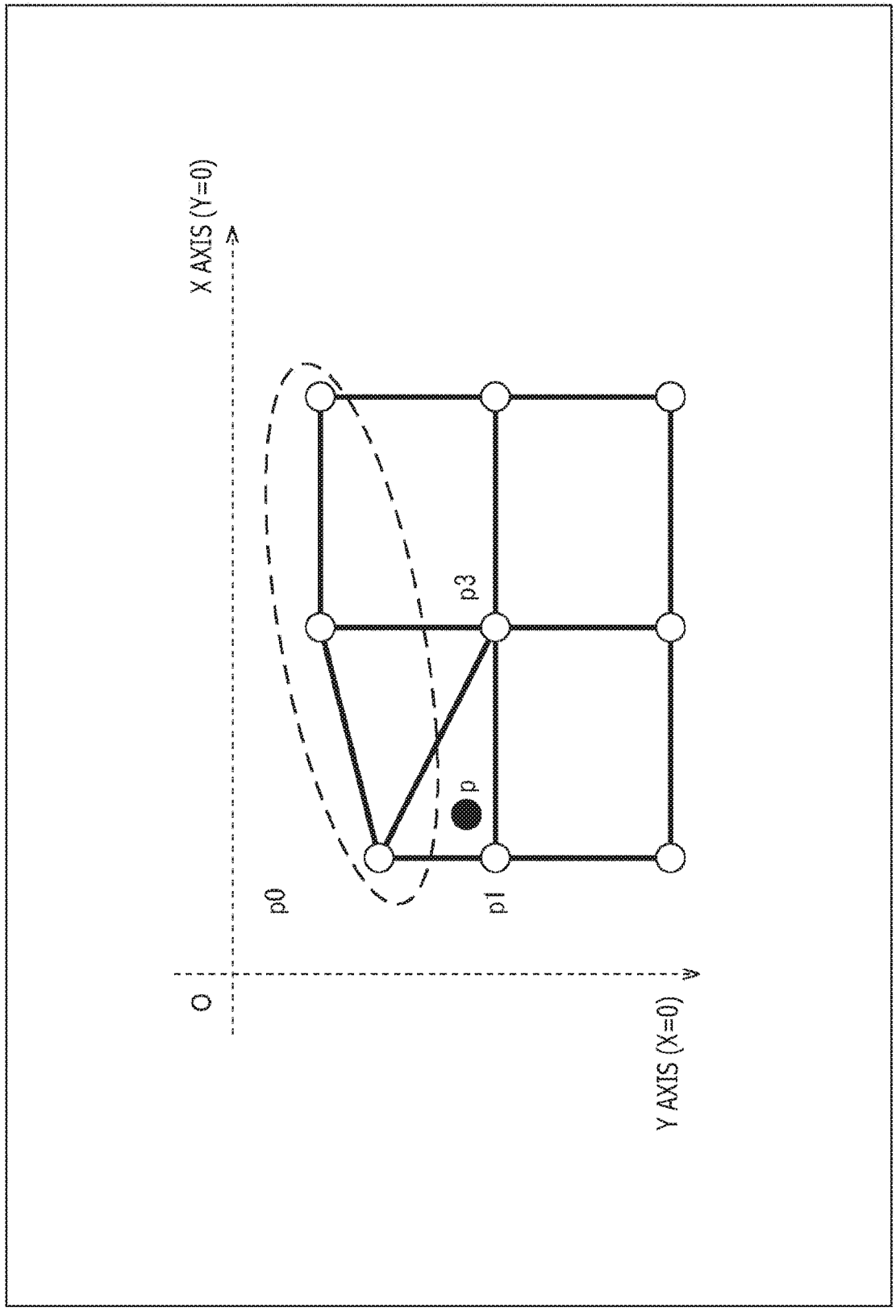
FIG. 13 is a diagram illustrating an example of a manner in which a correction vector is generated.
Figure 14:
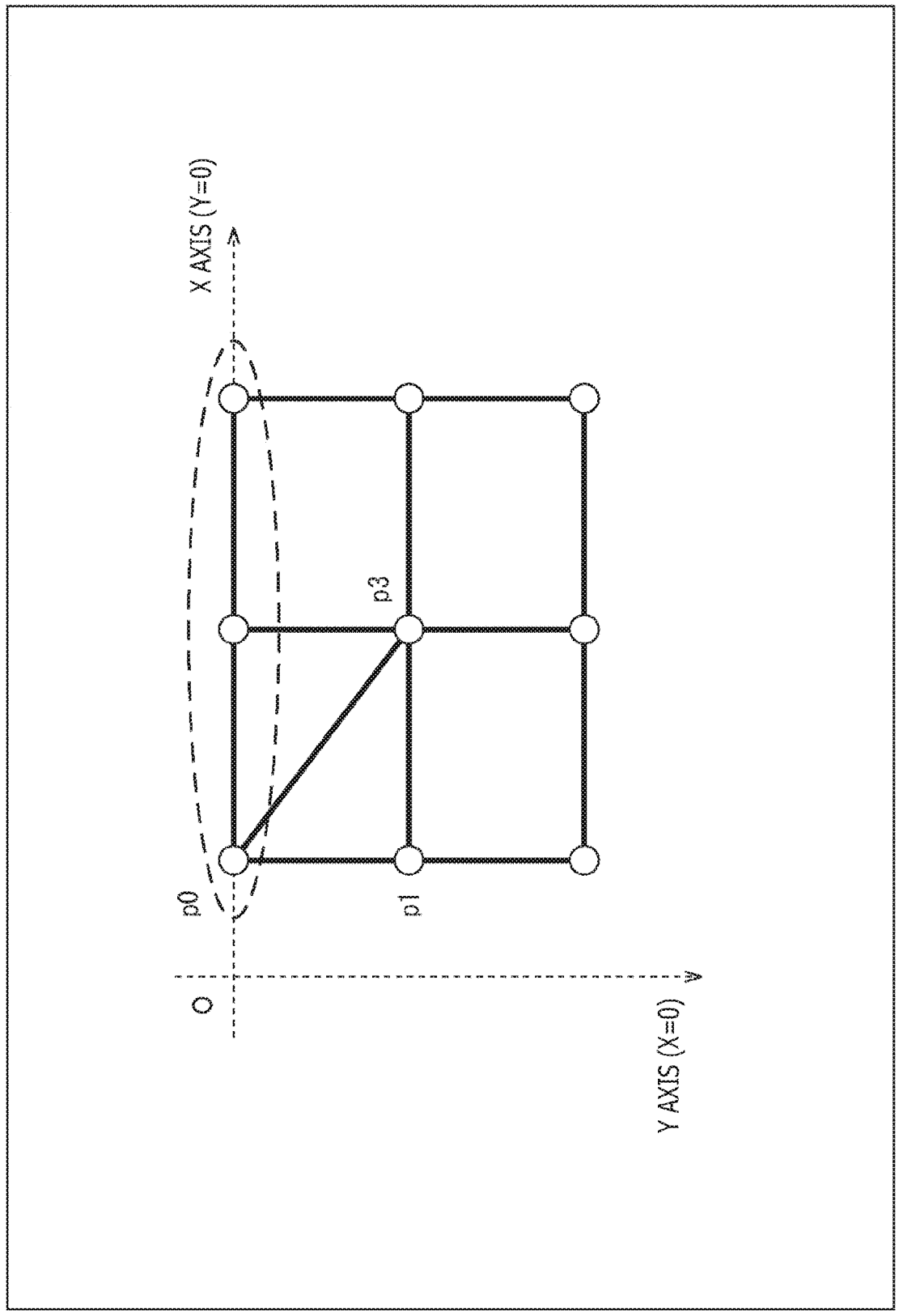
FIG. 14 is a diagram illustrating an example of a manner in which a correction vector is generated.

For example, it is assumed that the frame position of a projected image is distorted as illustrated within the dotted line frame in FIG. 13. In the case of correcting the distortion of the image as illustrated in FIG. 14, the correction vector calculation section 233 corrects the distortion, for example, by applying interpolation within a triangular element. For example, the correction vector calculation section 233 sets points p1 and p2 relative to an origin p0 as illustrated in FIG. 13 and carries out linear interpolation for a point p inside a region surrounded by the three points (rectangular element).

A local coordinate system that includes a triangle having its origin at a point p0 is obtained by a basis vector $e_u$ and a basis vector $e_v$ as given by the following formulas (1) and (2), and a transformation matrix to a global coordinate system is given by the following formula (3) in which $u_p$ and $v_p$ represent the coordinates of the local coordinate system of a point p and $x_p$, $y_p$, and $z_p$ represent the coordinates of the global coordinate system.

[Math. 1]

$$e_u = p_1 - p_0 \tag{1}$$

$$e_v = p_2 - p_0 \tag{2}$$

$$p = p_0 + u_p e_u + v_p e_v \tag{3}$$

Also, the coordinates are expressed by their components as given by the following formula (4).

[Math. 2]

$$\begin{pmatrix} x_p \\ y_p \\ z_p \end{pmatrix} = \begin{pmatrix} x_{p0} \\ y_{p0} \\ z_{p0} \end{pmatrix} + \begin{pmatrix} x_{eu} & x_{ev} \\ y_{eu} & y_{ev} \\ z_{eu} & z_{ev} \end{pmatrix} \begin{pmatrix} u_p \\ v_p \end{pmatrix} \tag{4}$$

Letting respective values at nodes p0, p1, and p2 be denoted as $C_0$, $C_1$, and $C_2$, a value C at the point p in the element can be expressed by the formula (5) given below.

[Math. 3]

$$C=(C_0+u_p(C_1-C_0)+v_p(C_2-C_0) \quad (5)$$

Here, $u_p$ and $v_p$ are the coordinates of the point p in the local coordinate system. C represents an interpolation correction vector value, and $C_0$-$C_2$ represents a correction vector value of p0-p2.

Needless to say, any technique may be used for interpolation, and the interpolation technique is not limited to the above example.

In step S144, the correction vector calculation section 233 supplies the correction vector calculated as described above to the projection control section 201, thus reflecting the correction vector into projection control. That is, the projection control section 201 corrects the image to be projected by the projection section 121, by using the correction vector.

When the process in step S144 ends, the correction vector generation process ends, and the process returns to FIG. 4.

Figure 15B:
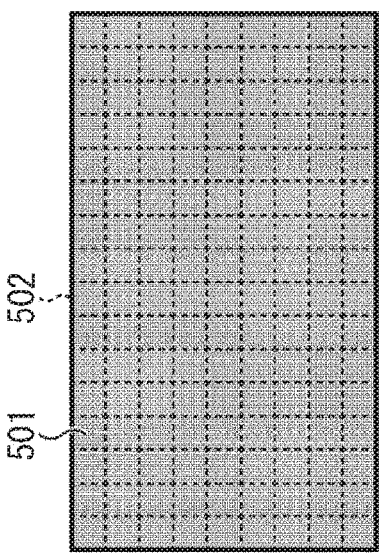
FIGS. 15A and 15B illustrate diagrams of an example of a manner in which an image is corrected.
Figure 15A:
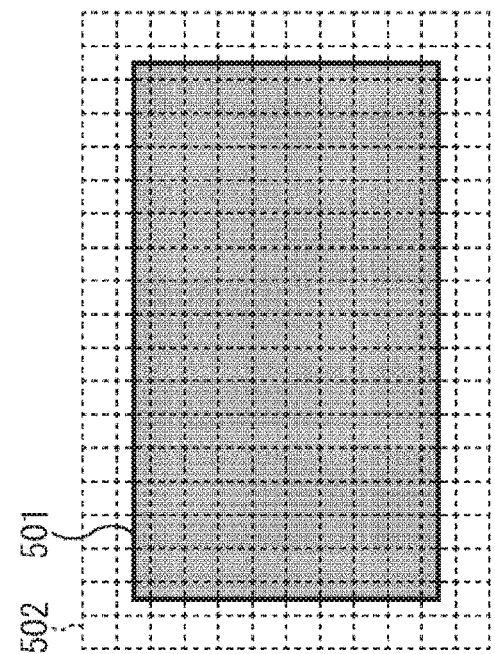

In the case where the projected image position (bounds) is not controlled as described above, for example, similarly to a projected image 502 depicted in FIG. 15A, a projected image may lie off the screen 501 or be misaligned, possibly degrading a subjective image quality (image quality as seen from the user) of the projected image 502.

In contrast, performing each of the processes described above allows projection to achieve alignment between the screen 501 and the position (bounds) of the projected image 502 with ease. This keeps, to a minimum, degradation of the subjective quality of the projected image 502. Also, a customer experience value can be improved from the viewpoint of design and the like. Further, the above correction allows for correction of not only the frame position of the projected image but also internal distortion of the image. This keeps, to a minimum, degradation of the subjective quality of the projected image 502.

<Correction in the Middle of Content Viewing>

The correction as described above may be performed while content is projected or when no content is projected. In the case where the correction is performed while content is projected, the correction is preferably performed in such a manner as not to interfere with content viewing.

In that case, for example, it is only necessary to project an image for detecting a screen frame position by using the Imperceptible Structured Light technique disclosed in PCT Patent Publication No. WO2017/104447. For example, it is only necessary to embed a uniform luminance pattern in content and emit the pattern. In that case, the luminance value of the projected image for detecting a screen frame position may be reduced to a suitable level. This can render the projected image for detecting a screen frame position, which is embedded in content, inconspicuous, thus keeping, to a minimum, degradation of the subjective image quality of content.

<Projected Image for Detecting a Screen Frame Position>

It should be noted that an image of any kind may be used as a projected image for detecting a screen frame position and that the luminance level does not need to be uniform across the image. Also, any luminance level may be used, and a black image (image with a luminance level of 0) may be used rather than a white image. Further, for example, a plurality of images with different luminance levels and patterns may be used.

<Correction Range>

Although a description has been given above regarding correction of a projected image as a whole, the present disclosure is not limited thereto, and only part of a projected image, for example, may be corrected. For example, the projection of an image from under the screen with an ultra-short focus projector tends to cause distortion in the upper side of the screen. In such a case, a comparatively highly distorted portion (part of the upper side of the screen) may be subjected to the above correction.

<Position of the Projection Imaging Apparatus>

Although a description has been given above regarding the projection of an image by the projection imaging apparatus 101 from near the screen 102 as with what is called an ultra-short focus projector, the projection imaging apparatus 101 may be located at any position. For example, the projection imaging apparatus 101 may project an image at a distance from the screen 102 as with what is called a long-focus projector.

3. Second Embodiment

<Another Configuration Example>

The projection imaging apparatus 101 to which the present technology is applied is not limited in configuration to the example in FIG. 2 described above. For example, any number of the projection sections 121 and the imaging sections 122 may be provided, and the single section or a plurality of the sections may be provided. That is, the projection imaging unit 111 is not limited in configuration to the example in FIG. 1 and is configured as desired. For example, as illustrated in FIG. 16A, the projection imaging apparatus 101 (projection imaging unit 111) may include one projection section 121 and one imaging sections 122. Also, for example, as illustrated in FIG. 16B, the projection imaging apparatus 101 (projection imaging unit 111) may include one projection section 121 and four imaging sections 122 (imaging sections 122-1 to 122-4). Also, the projection imaging unit 111 may include components other than the projection section 121 and the imaging sections 122.

Also, the projection imaging apparatus 101 may include the plurality of projection imaging units 111. In that case, the projection imaging units 111 need not be identical in configuration. For example, the projection imaging units 111 may differ in number of projection sections 121 or imaging sections 122. Also, the projection imaging apparatus 101 may include the plurality of control units 112. In that case, the control units 112 need not be identical in configuration. Also, in that case, all the control units 112 may cooperate with each other to handle the process described above, or some of the control units 112 may handle the process described above.

Also, the projection imaging unit 111 and the control unit 112 may be provided separately (two different apparatuses). For example, the projection imaging apparatus 101 may be, for example, configured as a system that includes a plurality of apparatuses as illustrated in FIG. 17.

A projection imaging system 800 in FIG. 17 includes a control apparatus 801, a projection imaging apparatus 802-1, and a projection imaging apparatus 802-2. Each of the projection imaging apparatus 802-1 and the projection imaging apparatus 802-2 is connected to the control apparatus 801 in a manner that allows communication through wired or wireless communication. In the case where there is no need to distinguish between the projection imaging apparatuses 802-1 and 802-2, the two will be referred to as the projection imaging apparatuses 802.

The control apparatus 801 has a similar configuration and functions to the control unit 112 (FIG. 2) and handles similar processes. The projection imaging apparatuses 802 have a similar configuration and functions and handle similar processes to the projection imaging unit 111. That is, the projection imaging system 800 has a similar configuration and functions and handles similar processes to the projection imaging apparatus 101 that includes one control unit 112 and two projection imaging units 111 connected to the control unit 112.

The present technology is applicable to the projection imaging system 800 configured in this manner, similarly to the projection imaging apparatus 101. The application of the present technology described in the first embodiment allows the projection imaging system 800 to control the image projection position with more ease.

It should be noted that any number of the projection imaging apparatuses 802 may be provided and that there may be only one projection imaging apparatus 802 or two or more projection imaging apparatuses 802. Also, the projection imaging apparatuses 802 may or may not be identical in configuration. Also, the projection imaging system 800 may include the plurality of control apparatuses 801. In that case, the respective control apparatuses 801 may or may not be identical in configuration. Also, the control apparatus 801 may be integrated with any of the projection imaging apparatuses 802 (that is, may be configured as a single apparatus). Further, the projection section 121 and the imaging sections 122 may be different units (or apparatuses). Needless to say, the projection imaging system 800 may include apparatuses other than the control apparatus 801 and the projection imaging apparatus 802 described above.

Also, the control apparatus 801 and the projection imaging apparatus 802 may be connected in the projection imaging system 800 in a manner that allows communication via a network as any communication network.

Any technique may be used in the network for communication. For example, wired communication, wireless communication, or both thereof may be used. Also, the network may include a single communication network or a plurality of communication networks. The network may include communication networks and channels conforming to any communication standard, for example, the Internet, a public telephone line network, a wireless mobile wide area communication network such as what is called a 3G or 4G line, a WAN (Wide Area Network), a LAN (Local Area Network), a wireless communication network that allows communication compliant with the Bluetooth (registered trademark) standard, a communication channel for short-range wireless communication including NFC (Near Field Communication) or the like, a communication channel for infrared communication, and a communication channel for wired communication compliant with an HDMI (registered trademark) (High-Definition Multimedia Interface), a USB (Universal Serial Bus), or other standards, or the like.

4. Note

<Software>

The above series of processes can be performed by hardware or software. In the case where the above series of processes are performed by software, the program included in the software is installed from a network or a recording medium.

For example, in the case of the projection imaging apparatus 101 (control unit 112) in FIG. 2, the recording medium includes the removable medium 151 that has the program recorded therein and that is distributed separately from the projection imaging apparatus 101 to deliver the program to the user. In that case, for example, as the removable medium 151 is inserted into the drive 145, the program sored in the removable medium 151 can be read out and installed to the storage section 143.

Also, the program can be provided via a wired or wireless transmission medium such as a local area network, the Internet, or digital satellite broadcasting. For example, in the case of the projection imaging apparatus 101 (control unit 112) in FIG. 2, the program can be received with the communication section 144 and installed to the storage section 143.

In addition to the above, the program can be installed in advance to the storage section, the ROM, or the like. For example, in the case of the projection imaging apparatus 101 (control unit 112) in FIG. 2, the program can be installed to the ROM (not depicted) built into the storage section 143 or the control section 131, or the like.

<Target for Application of the Present Technology>

Also, the present technology can be implemented as components of all kinds incorporated in any apparatus or an apparatus included in a system (i.e., some components of an apparatus). Examples of such components include a processor (e.g., video processor) as a system LSI (Large Scale Integration) or the like, a module using a plurality of processors or the like (e.g., video module), a unit using a plurality of modules or the like (e.g., video unit), and a set with other functions added to a unit (e.g., video set).

Further, the present technology is applicable to a network system that includes a plurality of apparatuses. For example, the present technology is applicable to a cloud service that provides services related to images (videos) to any terminals including computers, AV (Audio Visual) equipment, mobile information processing terminals, IoT (Internet of Things) devices, and the like.

It should be noted that systems, apparatuses, processing sections, and the like to which the present technology is applied is applicable to any sectors including traffic, medical, crime prevention, agriculture, livestock, mining, beauty, manufacturing, home appliances, weather, nature monitoring, and the like. In addition, the application is determined as desired.

For example, the present technology is applicable to systems and devices used to provide content for appreciation purpose and the like. Also, for example, the present technology is applicable to systems and devices used for traffic purposes such as traffic condition monitoring and autonomous drive control. Further, for example, the present technology is applicable to systems and devices used for security purposes. Also, for example, the present technology is applicable to systems and devices used for automatic control over machinery and the like. Further, for example, the present technology is applicable to systems and devices used for agricultural and livestock farming purposes. Also, the present technology is applicable to systems and devices used to monitor natural conditions such as volcanos, forests, and oceans, and wildlife. Further, for example, the present technology is also applicable to systems and devices used for sporting purposes.

<Others>

The embodiments of the present technology are not limited to those described above and may be modified in various ways without departing from the gist of the present technology.

For example, the present technology can be implemented as components of all kinds included in an apparatus or system (i.e., some components of an apparatus). Examples of such components include a processor (e.g., video processor) as a system LSI (Large Scale Integration) or the like, a module using a plurality of processors or the like (e.g., video module), a unit using a plurality of modules or the like (e.g., video unit), and a set with other functions added to a unit (e.g., video set).

It should be noted that the system in the present specification refers to a set of a plurality of constituent elements (e.g., apparatuses, modules (parts)), and it does not matter whether or not all the constituent elements are accommodated in the same housing. Therefore, a plurality of apparatuses accommodated in separate housings and connected via a network and an apparatus whose modules are accommodated in a single housing are both systems.

Also, for example, a component described as a single apparatus (or a single processing section) may be divided into a plurality of apparatuses (or processing sections). Conversely, components described above as a plurality of apparatuses (or processing sections) may be combined into a single apparatus (or a single processing section). Needless to say, components other than those described above may also be added to each of the apparatuses (each of the processing sections). Further, as long as the components or operation of the system as a whole substantially remains the same, some components of a certain apparatus (or a certain processing section) may be included in the components of another apparatus (or another processing section).

Also, for example, the present technology can adopt a cloud computing configuration in which one function is processed by a plurality of apparatuses in a shared and cooperative manner via a network.

Also, for example, the above program can be executed in any apparatus. In that case, it is acceptable as long as the apparatus has necessary functions (e.g., functions blocks) to acquire necessary information.

Also, for example, each step described in the above flowchart can be performed not only by a single apparatus but also by a plurality of apparatuses in a shared manner. Further, in the case where a single step includes a plurality of processes, the plurality of processes included in the single step can be performed not only by a single apparatus but also by a plurality of apparatuses in a shared manner. In other words, a plurality of processes included in a single step can be performed as processes of a plurality of steps. Conversely, a process described as a plurality of steps can be combined into a single step and performed.

It should be noted that the program executed by the computer may perform the processes of the steps defining the program chronologically according to the order described in the present specification, in parallel, or individually when necessary as when invoked. That is, unless inconsistency arises, the processes of the respective steps may be performed in a different order from the order described above. Further, the processes of the steps defining the program may be performed in parallel to those of another program or combined and performed together with those of another program.

It should be noted that the plurality of present technologies described in the present specification can be carried out independently of each other and alone unless inconsistency arises. Needless to say, any number of the plurality of present technologies can be carried out in combination. For example, some or all of the present technologies described in any of the embodiments can be carried out in combination with some or all of the present technologies described in another embodiment. Also, some or all of any of the present technologies described above can be carried out together with other technologies not described above.

It should be noted that the advantageous effects described in the present specification are merely illustrative and not restrictive, and there may be other advantageous effects.

It should be noted that the present technology can also have the following configurations.

(1)

An information processing apparatus including:

a correction information generation section adapted to generate correction information of an image such that the image is projected onto a desired region of a real space.

(2)

The information processing apparatus according to (1), in which the correction information generation section generates the correction information such that the projected image as seen from a given viewpoint position is located at the desired region.

(3)

The information processing apparatus according to (1), in which the correction information generation section generates a correction vector for correcting each pixel position of the image as the correction information.

(4)

The information processing apparatus according to (1), further including:

a region setting section adapted to set the region, in which the correction information generation section generates the correction information such that the image is projected onto the region set by the region setting section.

(5)

The information processing apparatus according to (4), in which the region setting section sets the region in the image.

(6)

The information processing apparatus according to (5), in which the region setting section identifies the region in the image by using a captured image of a projection plane including the region.

(7)

The information processing apparatus according to (6), in which the region setting section identifies a contour of the region in the image by using a contour point group indicating the contour of the region in the captured image.

(8)

The information processing apparatus according to (7), in which the region setting section identifies the contour of the region in the image from the contour point group of the region in the captured image by using corresponding points indicating correspondence between the image and the captured image.

(9)

The information processing apparatus according to (8), in which the region setting section identifies, for each local portion, the contour of the region in the image by homographically transforming the local contour point group of the region in the captured image on the basis of the corresponding points corresponding to the local contour point group and a corresponding point group in a periphery of the corresponding points.

(10)

The information processing apparatus according to (9), in which the region setting section interpolates, by using a curve, the contour of the region in the image identified for each local portion by using the contour point group of the region in the captured image.

(11)

The information processing apparatus according to (8), in which the region setting section detects the corresponding points by using the image to be projected and the captured image and identifies the contour of the region in the image from the contour point group of the region in the captured image by using the detected corresponding points.

(12)

The information processing apparatus according to (7), in which the region setting section detects the contour of the region in the captured image and identifies the contour of the region in the image by using the contour point group indicating the detected contour.

(13)

The information processing apparatus according to (12), in which the region setting section detects the contour of the region from a captured image of the projection plane onto which a given image is projected according to luminance of each pixel.

(14)

The information processing apparatus according to (13), in which the region setting section detects the contour of the region by binarizing the captured image.

(15)

The information processing apparatus according to (13), in which the given image has a uniform luminance level.

(16)

The information processing apparatus according to (13), in which the given image includes an image all of whose pixels are set to a maximum luminance level.

(17)

The information processing apparatus according to (6), in which the region setting section corrects distortion of the captured image and identifies the region in the image by using the corrected captured image.

(18)

The information processing apparatus according to (6), further including:

an imaging section adapted to generate the captured image by capturing an image of the projection plane.

(19)

The information processing apparatus according to (1), further including:

a projection section adapted to project the image.

(20)

An information processing method including:

generating correction information of an image such that the image is projected onto a desired region of a real space.

REFERENCE SIGNS LIST

100 Projection imaging system, 101 Projection imaging apparatus, 102 Screen, 111 Projection imaging unit, 112 Control unit, 121 Projection section, 122 Imaging section, 131 Control section, 201 Projection control section, 202 Imaging control section, 211 Corresponding point detection section, 212 Screen frame position detection section, 213 Posture estimation section, 214 Screen shape estimation section, 215 Correction vector generation section, 221 Frame detection imaging processing section, 222 Lens distortion correction section, 223 Captured image frame position detection section, 224 Projected image frame position identification section, 225 Frame position interpolation process section, 231 Viewpoint position estimation section, 232 Viewpoint image frame position calculation section, 233 Correction vector calculation section, 800 Projection imaging system, 801 Control apparatus, 802 Projection imaging apparatus

The invention claimed is:

1. An information processing apparatus, comprising:
at least one imaging device configured to capture a first image of a projection plane which includes a specific region of a real space; and
at least one processor configured to:
identify a contour of a first region in a second image based on a contour point group which indicates a contour of a second region in the captured first image, wherein
the first region and the second region correspond to the specific region of the real space, and
the second image is an image which is to be projected on the specific region of the real space;
set the first region in the second image based on the identified contour of the first region in the second image; and
generate correction information of the second image such that the second image is projected onto the set specific region in the real space.

2. The information processing apparatus according to claim 1, wherein the projected second image, as seen from a specific viewpoint position, is located at the specific region based on the correction information.

3. The information processing apparatus according to claim 1, wherein the correction information is a correction vector for correction of each pixel position of the second image.

4. The information processing apparatus according to claim 1, wherein the at least one processor is further configured to identify the contour of the first region in the second image from the contour point group of the second region in the captured first image based on a plurality of corresponding points indicating a correspondence between the second image and the captured first image.

5. The information processing apparatus according to claim 4, wherein
the at least one processor is further configured to identify, for each local portion, the contour of the first region in the second image based on a homographic transformation of the contour point group of the second region in the captured first image, and
the homographic transformation is based on the plurality of corresponding points corresponding to the contour point group and a corresponding point group in a periphery of the plurality of corresponding points.

6. The information processing apparatus according to claim 5, wherein the at least one processor is further configured to interpolate, by using a curve, the contour of the first region in the second image identified for each local portion, based on the contour point group of the second region in the captured first image.

7. The information processing apparatus according to claim 4, wherein the at least one processor is further configured to:
   detect the plurality of corresponding points based on the second image and the captured first image; and
   identify the contour of the first region in the second image from the contour point group of the second region in the captured first image, based on the detected plurality of corresponding points.

8. The information processing apparatus according to claim 1, wherein the at least one processor is further configured to:
   detect the contour of the second region in the captured first image; and
   identify the contour of the first region in the second image based on the contour point group which indicates the detected contour of the second region in the captured first image.

9. The information processing apparatus according to claim 8, wherein the at least one processor is further configured to detect the contour of the second region from the captured first image, of the projection plane onto which the first image is projected before the capture of the first image, based on a luminance of each pixel of the captured first image.

10. The information processing apparatus according to claim 9, wherein the at least one processor is further configured to detect the contour of the second region in the captured first image based on binarization of the captured first image.

11. The information processing apparatus according to claim 9, wherein the first image has a uniform luminance level.

12. The information processing apparatus according to claim 9, wherein all pixels of the first image are set to a maximum luminance level.

13. The information processing apparatus according to claim 1, wherein the at least one processor is further configured to:
   correct a distortion of the captured first image; and
   identify the first region in the second image by using the corrected captured first image.

14. The information processing apparatus according to claim 1, further comprising a projector configured to project at least one of the first image or the second image.

15. An information processing method, comprising:
   capturing, by at least one imaging device, a first image of a projection plane which includes a specific region of a real space;
   identifying, by at least one processor, a contour of a first region in a second image based on a contour point group which indicates a contour of a second region in the captured first image, wherein
      the first region and the second region correspond to the specific region of the real space, and
      the second image is an image which is to be projected on the specific region of the real space;
   setting, by the at least one processor, the first region in the second image based on the identified contour of the first region in the second image; and
   generating, by the at least one processor, correction information of the second image such that the second image is projected onto the set specific region in the real space.

* * * * *